United States Patent

Bouldin et al.

[11] Patent Number: 5,911,631
[45] Date of Patent: Jun. 15, 1999

[54] SEEDLING TRANSPLANTER WITH EASILY DETACHABLE GRIPPER

[75] Inventors: Floyd E. Bouldin; Stephen F. Springston; E. Lloyd Bouldin, all of McMinnville, Tenn.

[73] Assignee: Bouldin & Lawson, Inc., McMinnville, Tenn.

[21] Appl. No.: 08/792,830

[22] Filed: Jan. 30, 1997

Related U.S. Application Data

[63] Continuation-in-part of application No. 08/717,553, Sep. 23, 1996, Pat. No. 5,860,372.

[51] Int. Cl.⁶ .............................. A01C 11/02; B65G 47/90
[52] U.S. Cl. ......................... 47/1.01 R; 111/105; 47/901
[58] Field of Search ................................. 47/1.01 R, 901; 111/100, 101, 102, 104, 105; 294/116; 221/219; 414/403, 416, 591, 609

[56] References Cited

U.S. PATENT DOCUMENTS

| | | | |
|---|---|---|---|
| 4,750,439 | 6/1988 | de Grost | 111/105 |
| 4,947,579 | 8/1990 | Harrison et al. | 111/105 X |
| 5,160,235 | 11/1992 | Bikow | 111/105 X |
| 5,557,881 | 9/1996 | Bouldin et al. | 111/105 X |

*Primary Examiner*—Thomas B. Will
*Assistant Examiner*—Robert Pezzuto
*Attorney, Agent, or Firm*—Rick R. Wascher

[57] ABSTRACT

An apparatus and method for transplanting seedling from a first tray to a second tray. The apparatus includes a frame, a moveable carriage connected to the frame, and a conveyor system. In the preferred embodiment, a first conveyor is used to shuttle seedlings into the operative reaches of the apparatus and a second conveyor shuttles the transplanted seedlings out of the operative reaches of the apparatus. The carriage includes a gripper assembly comprised of a plurality of grippers slidably mounted to a guide rod system or track. A positioning mechanism is employed to move the carriage and associated gripper assembly. The grippers includes an upright support and a pair of pivotally connected spaced apart gripper fingers. The gripper fingers are separated by a separating member and can be easily detached from the carriage by a disconnect mechanism. The method of the present invention is directed to a method of lateral grasping of a seedling elevated above a first tray and transplanting it into the soil of a second tray without the need of pre-dibbling the soil of the second tray.

16 Claims, 21 Drawing Sheets

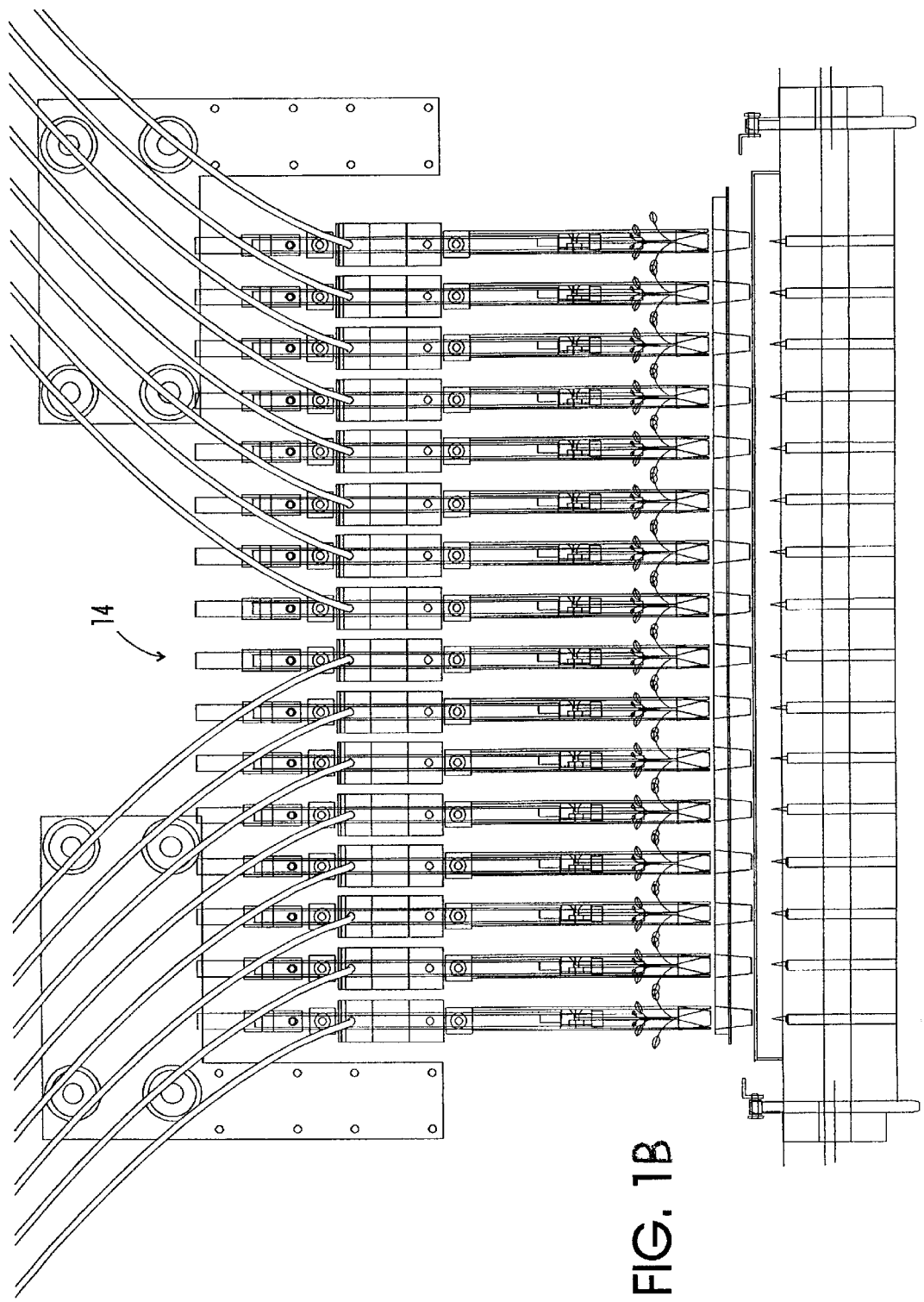

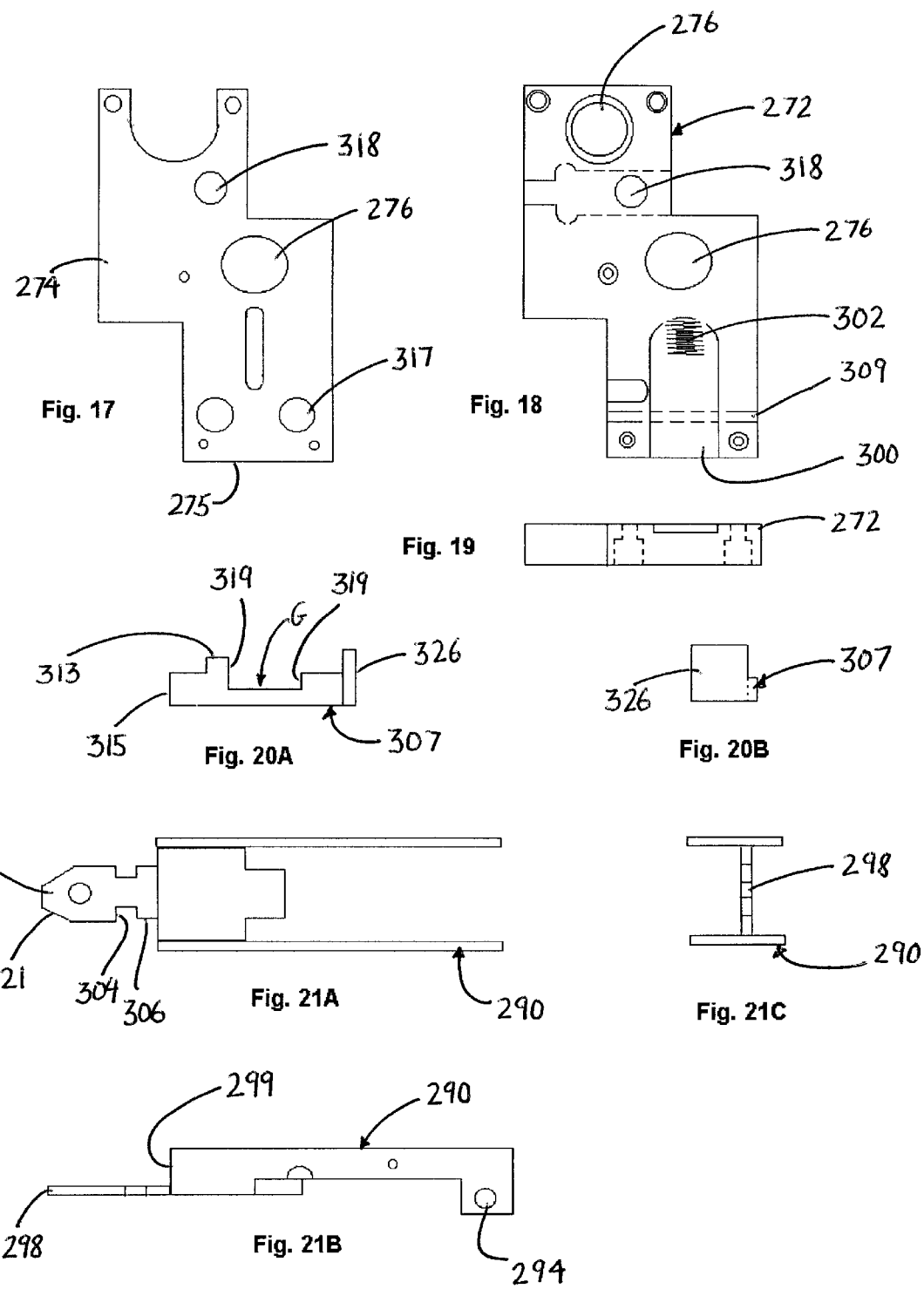

SEEDLING TRANSPLANTER WITH EASILY DETACHABLE GRIPPER

This is a continuation-in-part of application Ser. No. 08/717,553 filed on Sep. 23, 1996 now U.S. Pat. No. 5,860,372.

BACKGROUND OF THE INVENTION

1. Field of the Invention

The present invention relates generally to machines used in the nursery and greenhouse industry for extracting seedlings from a first seedling tray or "plug tray" with small seed germination cells and transplanting them into a second tray having growing cells larger than the seed germination cells of the plug tray to encourage continued unimpeded growth of each individual transplanted seedling.

2. Description of the Related Art

In the nursery and greenhouse industry (hereinafter referred to simply as the "growing" industry), seeds are initially germinated and the seedlings resulting therefrom are grown in trays having an array of small compartments or "cells" within the tray. The size of the tray cells are selected to be sufficient large to accommodate the root ball of the plant in the early stages of its development from a single seed into a small seedling while economically making use of the limited space available within a greenhouse or other nursery building. Once the seedlings have germinated and have developed root balls and it is determined that the continued unimpeded growth of the seedling is best continued in a tray having leger room to facilitate this growth, each seedling must be transplanted to a larger tray or pot for further growth and eventual outdoor planting or commercial sale.

The roots of the seedlings will typically form a compact ball with the soil contained within the tray compartments, which allows the seedling and the associated soil to be transplanted as a unit (the seedling "plug"). In the past, seedling plugs have been transplanted by hand into soil filled pots or other trays with larger cells. However, the high cost of labor and the seasonal nature of the growing industry has made manual transplanting undesirable.

Automatic transplanters are known which utilize specially fabricated seedling flats which permit the seedlings to be pressed through the base of a germination compartment into a pot located below. Other known transplanters use cam-driven rotating pairs of plate-like fingers to extract the seedlings, or utilize pre-bent metallic wire fingers which are retained in a straight configuration and injected into the soil surrounding the seedling. These known devices move the germinating tray on an indexable table with respect to the transplanting head of the apparatus.

What is needed is an apparatus of sturdy construction which may readily accommodate germinating trays of varying cell dimensions, and which will rapidly transplant seedlings to larger trays of other cell configurations. The present invention relates to apparatuses and methods of transplanting young plants from seedling trays to larger trays.

In the art to which the invention relates, complicated systems have been developed to transplant plants from a seedling plug tray, where they have initially germinated, to a larger flat tray where they will have more room to grow. These systems have been unduly complicated, and have sometimes injured the seedlings. In the case of a begonia seedling for example, begonia leaves are broad and grow close to the surface of the soil from which the primary stem extends. The prior systems and machines have been known to damage the begonia foliage when the seedling is extracted from the tray in which it germinates originally.

Furthermore, when the user of a transplanting machine wishes to change from one plug tray configuration to a different plug tray configuration, the component of the transplanter responsible for grasping the seedling must also be changed. The changeover of the grasping components is know to be a complicated, time consuming task, often taking several hours and entirely different grasping components. Such delays are undesirable by growers considering time is of the essence when performing their transplanting operations.

It would be desirable to develop a plant transplanting apparatus and method which can quickly and accurately transplant plants from a seedling tray to a larger tray, and facilitate the changeover from one plug tray configuration to another by providing a simple efficient mechanism to remove and reattach the grasping component of the machine. In addition, if a grasping component, often there are several, of the machine fails during operation, it would be advantageous to quickly remove or detach the grasping mechanism from the machine and reattach a replacement in a matter of seconds to further minimize delays in the transplanting process. Thus it would be desirable to develop such an apparatus and method which can transplant seedling plugs without damaging the seedling foliage, and have it adaptable to various sizes and types of trays and plants.

SUMMARY OF THE INVENTION

The transplanter typically includes three basic components: (i) a frame, (ii) a gripper assembly and (iii) a conveyor system. The frame generally includes a pair of spaced apart side frame sections held in their upright position by a plurality of cross frame members. In addition to providing enhanced structural stability to the transplanter, the cross frame members serve a plurality of other functions, such as providing ample frame structure to mount the various components of the conveyor system and gripper assembly.

With respect to the present invention, some of the cross frame members serves as guide rods for the moving components of the transplanter to reciprocate back and forth. These guide rods allow the use of bushing type bearing attached to the moving component and through which the guide rod is passed to enable a relatively secure but moveable attachment thereto. Of course, the interior diameter of the bushing type bearing component is slightly larger than the external diameter of the guide rod to enable the guide rod to pass therethrough in a relatively snug, yet substantially friction reduced manner.

With respect to an embodiment of the conveyor system, a first feed or delivery conveyor is positioned perpendicular to a secondary transplant or shuttle conveyor. While not mandatory, and considering the conveyors may be parallel to one another, this arrangement is generally preferred when one considers the work stations required to load and unload the transplanting machine, and how it is best to provide the worker with room to move within their work station without bumping into another working performing a different task.

The feed or delivery conveyor is preferably chain, belt or gear driven. Both conveyors typically include a continuous belt component which overlies a platform component. Associated with the belt of the feed or delivery conveyor are a plurality of lateral separating members. The separating members are positioned perpendicularly across the belt, as compared to the direction of belt rotation, and typically advance at the same rate as the belt.

In this manner, a plug tray of seedlings to be transplanted can be placed adjacent to and I between two adjacent separating members. As the separating members advance in the direction of the travel of the conveyor belt, the trays of seedlings are shuffled along the belt into the operating reaches of the transplanter. Plug trays are, therefore, loaded at the proximal end or beginning of the feed conveyor and are advanced toward the distal end of the feed conveyor.

In order to facilitate the removal of a seedling plug from its plug tray, the transplanter includes a subassembly including a plurality of individual pins spaced apart but aligned in a single row. The pins reciprocate from between a lower position and a raised position. A perforated plate is placed adjacent to and in the path of the trays and following the belt of the feed or delivery conveyor at its distal end.

When the pins are raised and lowered they travel through the aligned row of holes in the plate. As a plug tray is advanced along the belt by the separating bars, the tray is forced to overlie the perforations in the plate. The perforations in the plate generally correspond with the rows of cells in the tray. The cells of the typical plug tray further include holes or apertures formed in the bottom of each cell. In this fashion, as the transplanter of the present invention is operating, the row of pins moves from their lower position to their raised position, passing through the holes in the plate and the holes in the plug tray. As the pins pass through the holes in the plug trays they push the root balls of the seedling occupying the cell in which the pin has entered and causes the seedling plugs to be removed and elevated above the tray while resting atop the pins.

When the seedling plugs are in the raised position, removed from the tray in which they began their germination, a gripper assembly moves into position from a generally lateral direction to grasp and take possession of each individual seedling. The approach of the gripper assembly is believed to be particularly important because some seedlings have broad leafs with short stems, e.g., begonias. Lateral approach of the grippers allow the gripper fingers (described below) to push the leafy foliage aside and take possession of the seedling without damaging it. When the grippers have taken possession of the seedlings, the grippers move to a transplanting position and deposit the seedlings in trays resting on the delivery conveyor. The cycle is repeated until the feed tray is empty.

With respect to the gripper assembly, the actual grippers are operably mounted to a movable gantry or carriage. The individual grippers are preferably linked to one another by a flexible belt or unique cabling system. The slack in the belt or cable as it relates to the amount of cable or belt between each adjacent gripper assembly, determines the user selected spacing between the grippers during the transplantation process of the seedling plug into the delivery tray.

Thus, the carriage is designed to move the individual grippers into and out of alignment of the seedling plug tray and the secondary tray. The carriage preferably moves in a horizontal direction as well as in a vertical direction, and the separation distance of the individual grippers as well as the number of grippers depends upon the configuration of the trays (e.g., number of cells and their arrangement) being used for the transplanting operations.

The horizontal movements of the carriage are driven by pneumatic or hydraulic cylinders which are connected to the frame of the transplanter. In addition, the carriage further includes a geared track on which the individual belt-linked grippers may reciprocate in the vertical direction. The geared track is generally positioned at an inclined or declined angle (depending upon the frame of reference). When viewed from the rear and top of the transplanter, the geared track extends "away" and "downward" at a decline. Accordingly, the preferred vertical movement of the carriage is not an isolated vertical movement but a component of the complex movement of the carriage.

The carriage further includes a plurality of guide rods positioned in a substantially horizontal fashion with respect to the carriage and frame. Each gripper includes an attachment portion and a gripper finger assembly. The attachment portion includes the bushing-type bearing arrangement referred to above which slidably engages the guide rods, and further include a quick disconnect structure to enable the gripper finger assembly to be easily detached and reattached to the attachment portion. The guide rods therefore enable the plurality of belt or cable-linked grippers to slide inwardly and outwardly from a vertical centerline of the carriage.

In the rest position, the belt or cable-linked grippers are in their contracted position and form a horizontal stack or group of grippers in a side by side relationship. In this arrangement, as the carriage is moved in a distal to proximal (lateral) direction by the motor, and drive belt system, or the pneumatic cylinders, the gripper fingers, as will be described hereinbelow, are allowed to open and surround the leaves of a particular seedling from the horizontal direction. As mentioned above, lateral movements of the grippers in the plane of the seedlings is preferred in order to prevent damage of the leaves of the seedling.

Each gripper therefore has one or a pair of spaced apart, pivoting fingers, that partially comprise the gripper finger assembly. As the individual grippers are moved toward the seedlings by the carriage, the fingers are opened by a separating member in the nature of a plunger or air bladder mechanism interpositioned therebetween to allow sufficient room for the gripper fingers to surround the seedling. When the carriage and grippers reach their forward-most position and have surrounded the seedling, the fingers are allowed to close around the seedlings and take possession of them, which in turn allows the elevating pins to drop to their lower positions and no longer support the seedling plug.

Reverse actuation of the motor and belt system or pneumatic cylinder arrangement draws the carriage in a rearward direction in predetermined alignment with an open row in the second tray resting on the secondary conveyor and insert the seedling plugs into the soli thereof. At this time, the preferred embodiment of the apparatus emits a mist of water to enable the seedling plug to coalesce with the soil of the tray in which it was transplanted. Sensors are provided to detect the proper positioning of the grippers during the transplanting cycle. As the transplanting operations continue, the sensors detect the position of empty soiled filled cells (i.e., compartments without seedlings) of the delivery trays.

When an open row is detected, the carriage is withdrawn and stopped such that the individual grippers are slightly offset from the desired row in which the seedlings will be planted. When the carriage is moved to this transplanting position, down the declined track, the pairs of gripper fingers pierce the soil of the delivery trays. The angled fingers, or the angle of gripper presentation with respect to the tray, allow for insertion of the seedling at an angle and thus reduce inadvertent extraction of the transplanted seedling when the gripper fingers are withdrawn from the soil of the delivery trays after each successive cycle.

When the gripper fingers enter the soil, they automatically separate when the separating member is deactivated, i.e., reciprocating plunger is withdrawn from between the gripper fingers, or the air bladder is deflated or inflated depending upon the embodiment. As described above, a pulse or jet of water is ejected from a water supply line which is typically parallel with the long axis of each gripper. The water serves as a jet lance to insure the seedling is ejected from the space between the gripper fingers and also to rinse the tips of the gripper fingers and allow the soil of the seedling root ball to coalesce with the surrounding dirt of the transplanting tray.

After this operation is carried out, the grippers are removed as the geared carriage travels upward along the geared track. Thus, transplanting in this manner eliminates the need of pre-dibbling the trays prior to the introduction of the seedling.

The process continues until the sensor detects that all of the rows of the transplanter tray have been filled and the now filled transplanter trays are shuffled along the second or shuttle conveyor, which is perpendicular to the feed conveyor, and out of the working area of the transplanter of the present transplanter.

The present invention may be summarized in a variety of ways, one of which is the following: a n automated apparatus for transplanting plant plugs from a plug tray thereof to another tray, comprising: a frame having a front, a back, and spaced apart side members; a conveyor system for shuttling seedling trays into and out of the apparatus; a carriage supported by the frame; at least one gripper assembly supported by the carriage and having at least two finger elements; and a disconnect mechanism to enable the gripper finger elements to be easily attached and detached from the carriage.

The preferred embodiment of the inventive apparatus also includes a wetting apparatus for supplying liquid to the transplanted seedling, and a separating means for separating the plurality of grippers the predetermined user selected distance and contract the separated plurality of grippers to a substantially side by side group thereof in an accordion like fashion. The preferred conveyor system further includes a first conveyor system and a second conveyor system.

The preferred at least one gripper further includes a separating member configured to enable the at least two finger elements to be opened and closed during operation of the apparatus; and, a bushing type bearing system for attaching the at least one gripper assembly to the carriage. A flexible belt is supported by the carriage and attached to each of the at least one gripper assembly to maintain a constant spacing between each of the at least one gripper assembly.

The preferred apparatus further includes a fluid supply line attached to the inlet of the supply tube and the outlet of the supply tube is positioned adjacent to the soil penetrating portion of the at least two finger elements enabling the liquid dispensed therefrom to impinge on the seedling being transplanted.

The present invention may also be summarized as follows: an automated apparatus for transplanting seedlings from a first tray to a second tray, the apparatus having a frame, a conveyor system to shuttle seedlings, and at least one gripper assembly supported by a carriage which is supported by the frame, wherein the gripper assembly comprises: a fingered portion having a plurality of finger elements; a separating mechanism configured to enable the plurality of finger elements to open; and a disconnect mechanism to enable the portion of the gripper assembly having the plurality of finger elements to be easily attached and detached from the carriage.

The separating member preferably includes a member interpositioned between the plurality of finger elements which causes the finger elements to open and close in response to its movements. The separating member preferably comprises an air bladder or a plunger. The preferred carriage further includes a guide rod system onto which the at least one gripper assembly is reciprocally attached, and a bushing type bearing system interpositioned between the guide rod system and the at least one gripper assembly.

The present invention may also be summarized as follows: a gripper configured for use with an automated seedling transplanting apparatus for transplanting seedlings from a first tray to a second tray and having a guide rod system enabling at least one gripper assembly to reciprocally slide, wherein the gripper comprises: an attachment portion configured to enable the gripper to be moveably attached to the guide rod system; a plurality of finger elements; a separating member operably interpositioned between the plurality of finger elements to enable them to open and close; and a disconnect mechanism enabling the finger elements to be easily attached and detached from the attachment portion.

The preferred gripper, wherein the separating member is: an air bladder or a reciprocating plunger, and the separating member further partially comprises: air supply means for selectively inflating or deflating the air bladder.

It is an object of the present invention to provide an apparatus for transplanting seedlings from one tray to another without the need of pre-dibbling the tray in which the seedlings are transplanted.

It is an object of the present invention to provide an apparatus for transplanting seedlings from one tray to another while minimizing the damage to the foliage of the seedling.

It is an object of the present invention to provide an automatic transplanting apparatus having an angled set of grippers of the types described herein.

It is an object of the present invention to provide a transplanting apparatus with a carnage movable in the horizontal and vertical direction while transplanting.

It is an object of the present invention to provide a transplanting apparatus with a plurality of grippers having angled gripper fingers or presented into the transplanting tray at an angle of the type set forth and described herein.

It is an object of the present invention to provide a transplanting apparatus having a bushing type guide rod engaging reciprocating assembly to enable the seedling grasping components to reciprocate back and forth.

It is an object of the present invention to provide a transplanting apparatus with a gripper assembly comprising gripper finger assembly and an attachment assembly in which the gripper finger assembly can be easily attached and detached therefrom.

It is an object of the present invention to provide a transplanting apparatus with a pneumatic gripper finger assembly enabling the gripper finger assembly to open and close in response to the inflation or deflation, or vice versa, of the pneumatic bladder.

BRIEF DESCRIPTION OF THE DRAWINGS

FIG. 1B is a front view of an embodiment of a gripper assembly of the present invention;

FIG. 17 is an elevated perspective view of a cover component of the present invention;

FIG. 18 is an elevated perspective view of a body component of the present invention;

FIG. 19 is an end view of the body component shown in FIG. 18;

FIG. 20A is a side view of a disconnect component of the present invention;

FIG. 20B is an end view of the disconnect component shown in FIG. 20A;

FIG. 21A is a elevated perspective view of an embodiment of the gripper assembly frame component of the present invention;

FIG. 21B is a side view of the frame component shown in FIG. 21A;

FIG. 21C is a right side end view of the frame component shown in FIG. 21A;

DETAILED DESCRIPTION OF THE PREFERRED EMBODIMENT(S)

Figure 1A:
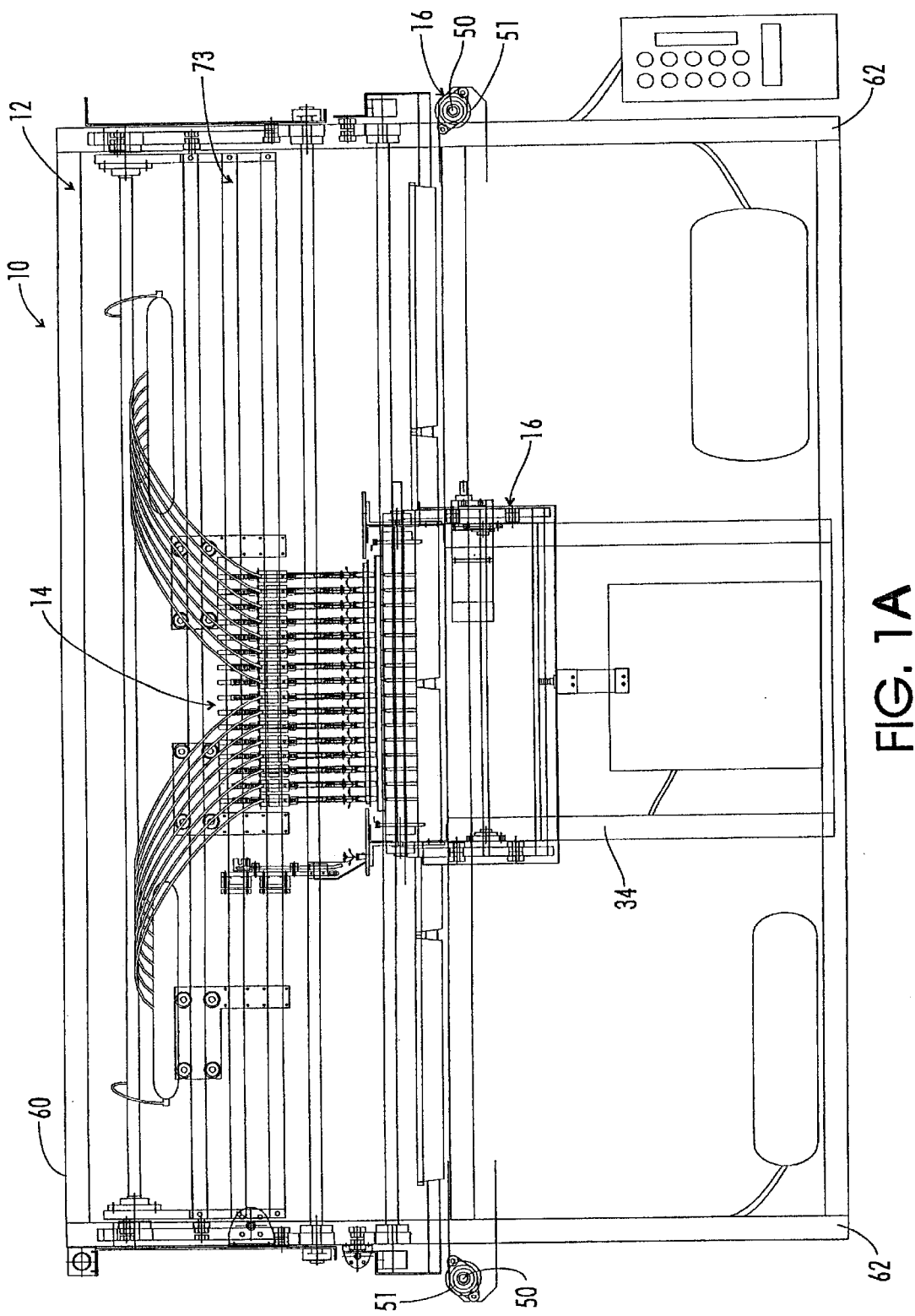
FIG. 1A is a front view of an embodiment of the apparatus of the present invention.
Figure 2:
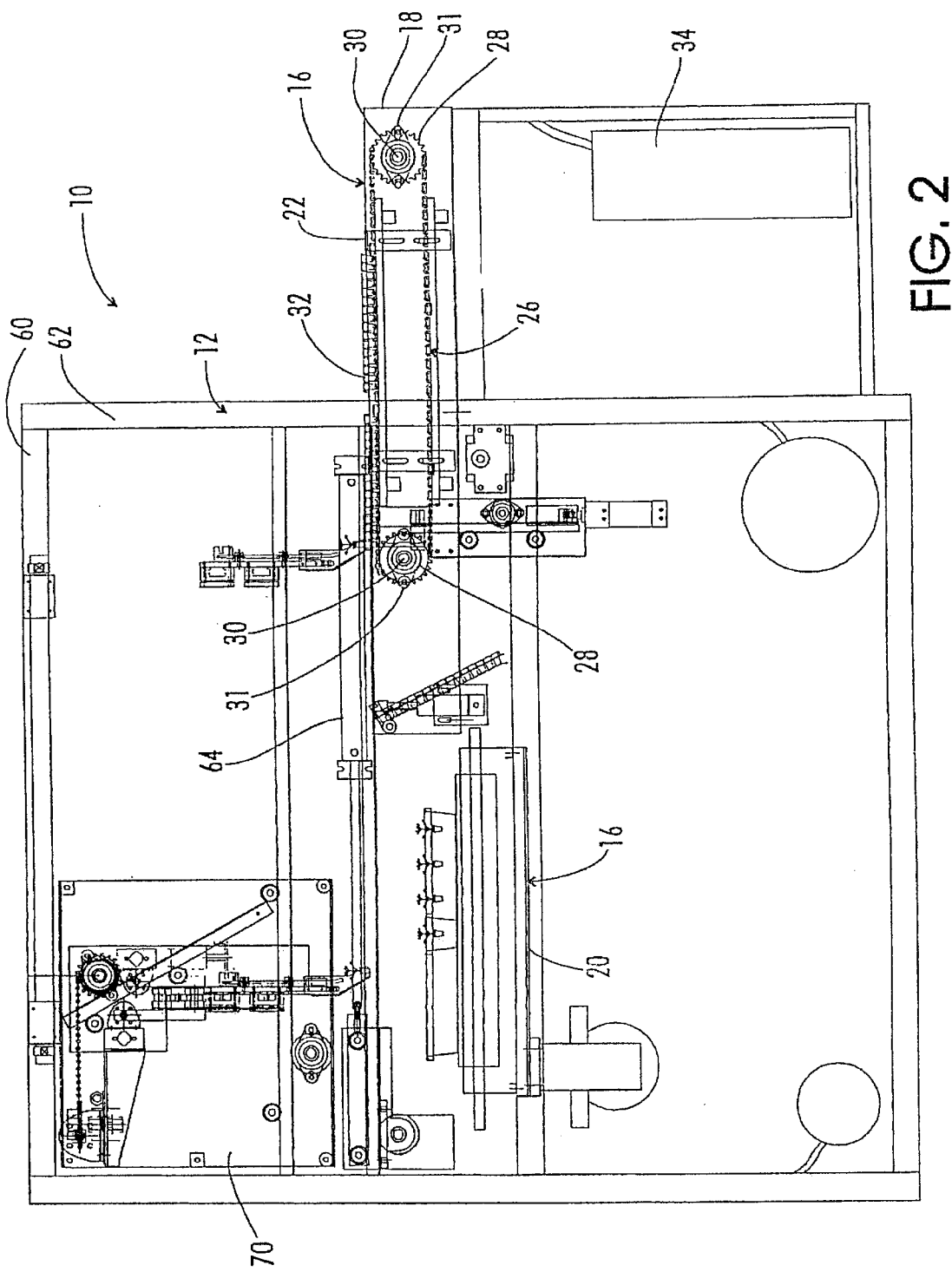
FIG. 2 is a left side view of the embodiment shown in FIG. 1 with certain components of the frame structure of the apparatus removed for better clarity of the elements shown in this Figure.

With reference to FIGS. 1A, 1B, 2, 8 and 9 a preferred embodiment of the present invention is designated generally by the reference numeral 10. The preferred embodiment 10 includes a frame assembly 12, a gripper assembly 14, and a conveyor system 16.

With reference to the conveyor system 16, a feed conveyor designated generally by the reference numeral 18 is shown in perpendicular relative alignment with a delivery conveyor system designated generally by the reference numeral 20. The feed conveyor system 18, may be parallel wit the delivery conveyor 20, and it preferably includes a substantially continuous belt 22 having separator bars 24 (see FIGS. 8 and 9) spaced apart along its length. The separator bars 24 are provided to assist in the shuttling of trays 44 along the belt. The feed belt drive assembly is designated generally by the reference numeral 26 and includes a plurality of sprockets 28. Sprockets 28 are actually spaced apart pairs of sprockets, only one of which is shown from the view illustrated in FIG. 2. The spaced apart pairs of sprockets are connected by shafts 30 attached to a portion of the frame 12 by bearings 31. A drive chain 32 engages both pairs of spaced apart sprockets 28. Of course, it is contemplated that a single drive chain may be used but a dual drive chain system is preferred to prevent binding or the torsional effects experienced by the belt 22.

A drive source (not shown) is coupled to the drive shafts 30 and/or sprockets 28 to provide the motive force to turn the substantially continuous belt 22 in order to shuttle the trays 44 into and toward the operating reaches of the gripper assembly of the apparatus as discussed below in the Mode of Operation section. Support 34, which actually partially comprises the frame 12, is provided as a means of elevation of the feed conveyor system 18 above the ground.

Figure 8:
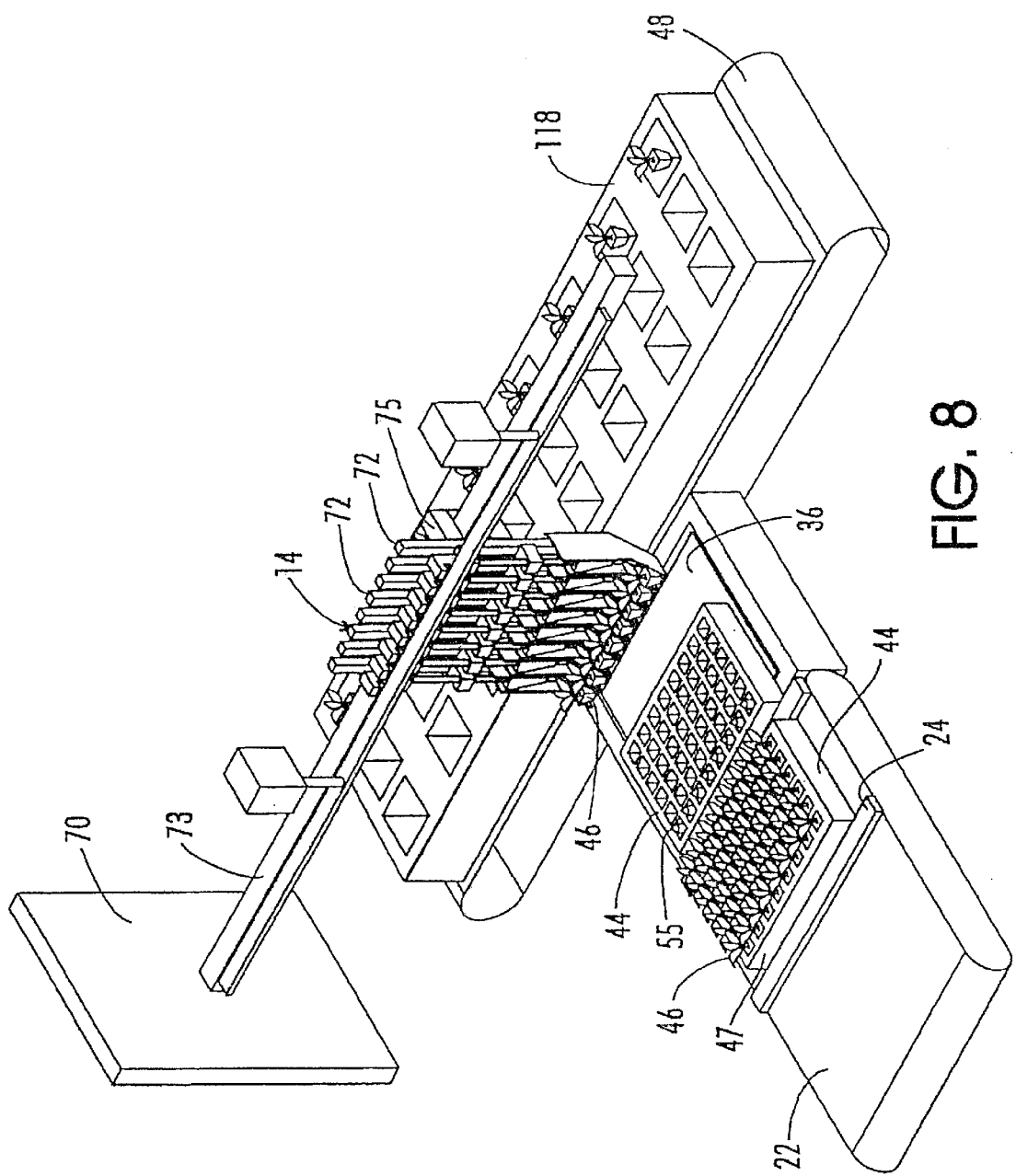
FIG. 8 is an elevated perspective representational view of the operative arrangement of various components of the present invention.
Figure 9:
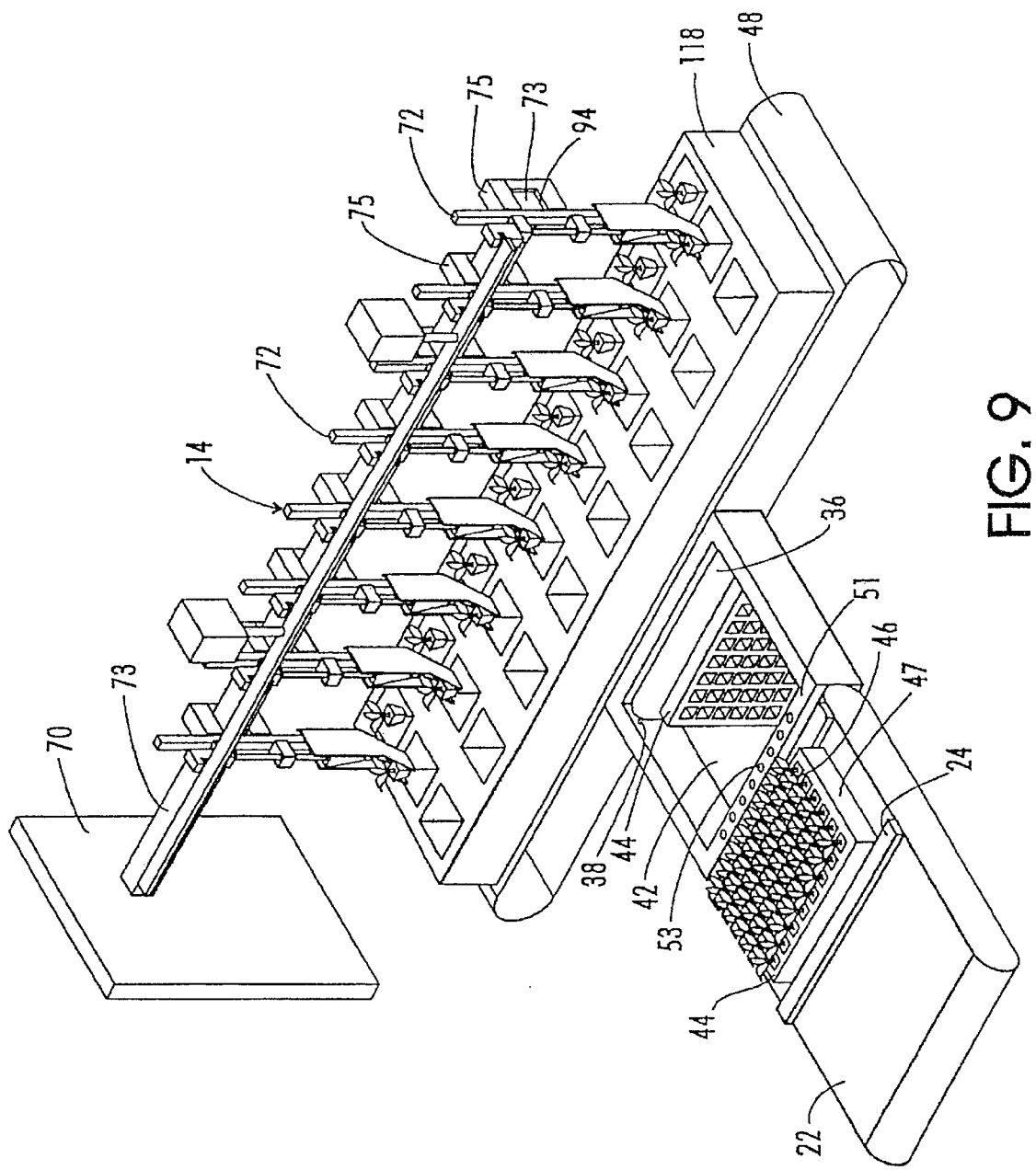
FIG. 9 is an elevated perspective representational view of the operative arrangement of various components of the present invention.

Optional door 36 (FIG. 8 and 9) serves as a trap door and, hence, includes a pivot 38 at its proximal end such that the planar door 36 may reciprocate from an open and closed position by an actuator (not shown). In the closed position, the opening designated generally by the reference numeral 42 of FIG. 9 is sealed off. When open, space 42 allows a tray 44 to fall therethrough after the seedling plugs 46 have been extracted therefrom in the manner set forth in the mode of operation discussed below.

With reference to the delivery conveyor system 20, another substantially continuous belt 48 is used. Similarly, a pair of spaced apart shafts 50 (see FIG. 1) are shown at opposing ends of the conveyor mounted rotatably on bearing supports 51. The drive assembly for the delivery conveyor is not shown, but may be of any suitable type, such as a direct drive shaft off of a conventional motor assembly, or the sprocket and chain configuration described with respect to the feed conveyor system 18 in the mode of operation set forth below.

With reference to the frame 12, the frame is generally comprised of a top 60, a pair of spaced apart side supports 62 to which hydraulic or pneumatic cylinders 64 may be attached. Cylinders 64 are used to move the gripper assembly 14 into and out of communication with the feed conveyor system 18 and delivery conveyor system 20.

The gripper assembly 14 is generally comprised of a carriage 70 resembling a sub-frame. A plurality of grippers 72 (shown as a collection in FIG. 1) are operably mounted to a rail system 73. Connection brackets 75 are used to move the collection of grippers 72 in directions away from a hypothetical axis drawn parallel and along the center of the feed conveyor system 18. The operable separation will be more thoroughly defined below.

Figure 3:
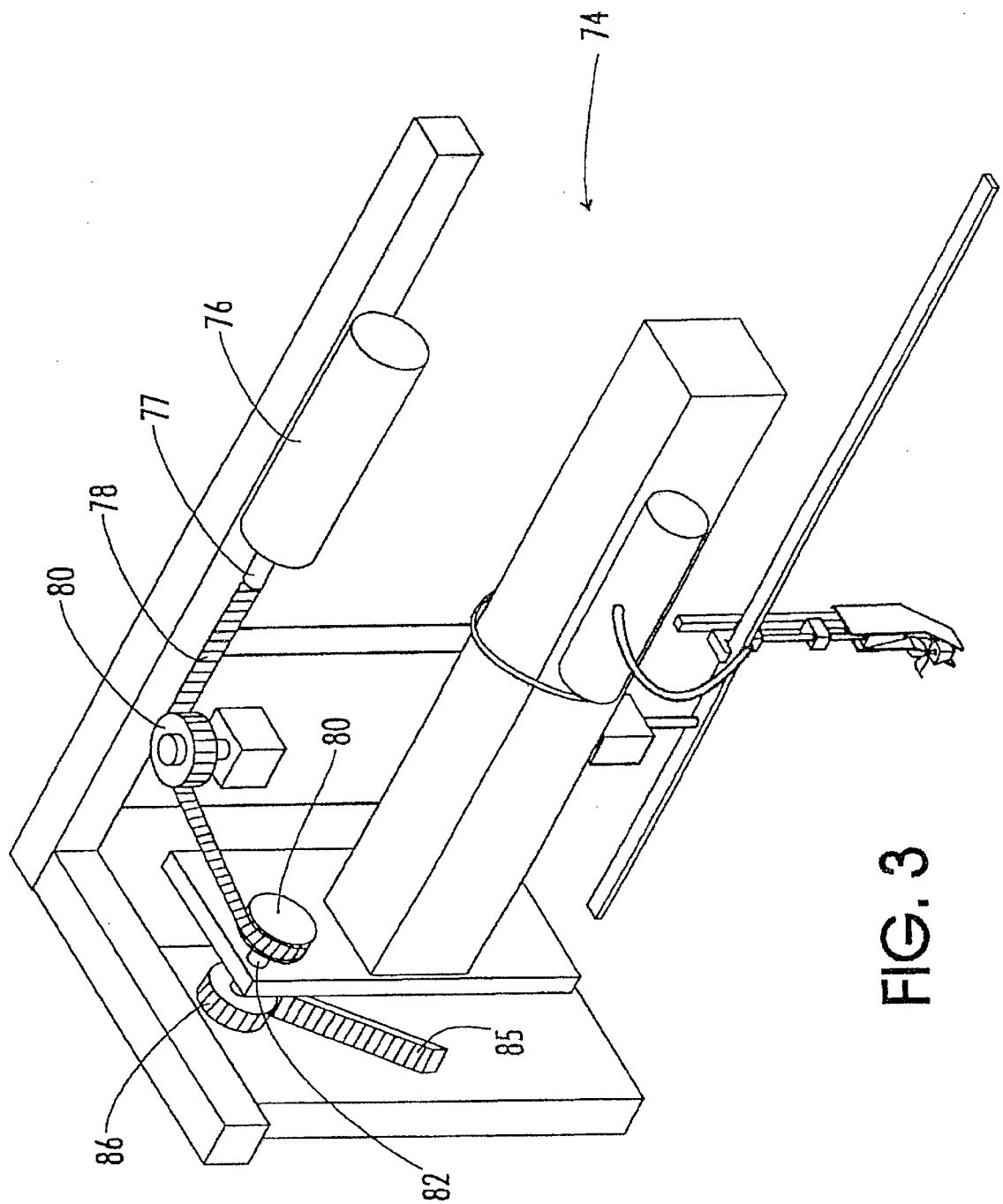
FIG. 3 is an elevated partially fragmented perspective view of an embodiment of the positioning assembly of the present invention.

Carriage 70 is designed for lateral movement as well as vertical movement. Cylinders 64 are provided to move the carriage in lateral directions front to back of the frame 12, and positioning assembly designated generally by the reference numeral 74 (see FIGS. 3 and 4) is used to move the carriage of the gripper assembly along a decline which has a vertical and horizontal components of movement. The positioning assembly 74 is partially comprised of an actuating cylinder 76 having an actuating plunger 77 extending therefrom.

Chain 78 having spaced apart ends, one of which is attached to the reciprocating plunger 77 and the other of which is engages sprockets 80 mounted to the shaft 82, provides a direct interconnection between the shaft 82 and the actuating cylinder 76. The track 84 has a plurality of notches which resemble geared grooves 85. A gear 86 meshes with the gear grooves 85 (see FIG. 3). As will be further described below, when the actuating cylinder plunger 77 is reciprocated inward or outward from the actuating cylinder 76, the length of chain 78 is drawn toward the cylinder or allowed to move away from it. When the plunger 77 is pulled inward toward the actuating cylinder 76, gear 86 rolls in a generally upward direction on the inclined track 84 as it meshes with the gear grooves 85 of the track.

Similarly, when the chain is allowed to move away from the actuating cylinder, the gear 86 meshing with the gear grooves 85 of the track 84, rides down the incline of the track 84. In this fashion, the elevation of the grippers 72 can be altered during operation. With respect to the alteration of the elevation of the grippers, attention is directed to FIGS. 2, 8 and 9 wherein it is shown that the feed conveyor 18 is merely elevated slightly above the horizontal plane of the delivery conveyor 20.

With reference to FIGS. 5A–5C, 6A, 6B and 7 a gripper is designated generally by the reference numeral 88. Gripper 88 is generally comprised of a vertical support arm 90 attached to the brackets 75. Belt 93 is shown positioned within the spaced apart components of the brackets 75. The belt 93 is generally a continuous strand which interlaces each of the grippers 88 of the gripper assembly 14 (as best seen in FIG. 1 pertaining to the collection of grippers illustrated in that Figure). Apertures 94 of the bracket 75 are provided to inter-engage and slide along the rails 73 of the carriage 70 as best seen in FIG. 1.

A water tube 100 is positioned substantially parallel to the vertical arm 90 and is held in place in relative alignment therewith and attachment thereto with a plurality of collars 104. The collars have a central bore (not shown) in which the water tube can slide. The water tube has an inlet end 101 and an outlet 103. Positioned near the outlet end and attached to the water tube 100 is a plunger like separator 106 (or as will be described below as an air bladder).

The separator 106 has at least one beveled surface 105 and is positioned between the gripper fingers 107 which are positioned in spaced apart pivoting relationship to one another. Pivot 109 enables the gripper fingers to open and close in a pinching fashion on the arm 90. Angle 110 or denoted by the Greek symbol alpha, is preferably 30 degrees. A similar angle of 30 degrees, or 60 from the horizontal, corresponds with the angle of the track 84 of FIG. 4. The preferred angle alpha of the gripper fingers or angle alpha of gripper presentation has been selected to correspond with the operation of the device which will be more thoroughly described hereinbelow.

In use, the gripper fingers 107 are separated by a downward movement of the water tube 100 in response to the plunger separator 106 passing between the spaced apart gripper fingers 107. In this fashion, the plunger separator has an inclined surface so that insertion of the plunger separator 106 forces the gripper fingers 107 apart and when extracted therefrom the biased pivot 109 enables the gripper fingers to flex back toward one another and create a pinching action. Thus, when the gripper fingers surround a seedling plug (as best seen in FIG. 8), the distal end 111 of the gripper fingers 107 surround the seedling plug 108. When the water tube is extracted, thereby removing the plunger 106 from between the gripper fingers 107, the gripper fingers pinch the plug in such a manner as to take possession of the plug seedling 108. Of course it is also contemplated that the gripper fingers may have a angled portion and the plunger may be symmetrical and lacking a beveled surface in order to accomplish the same function.

Figure 4:
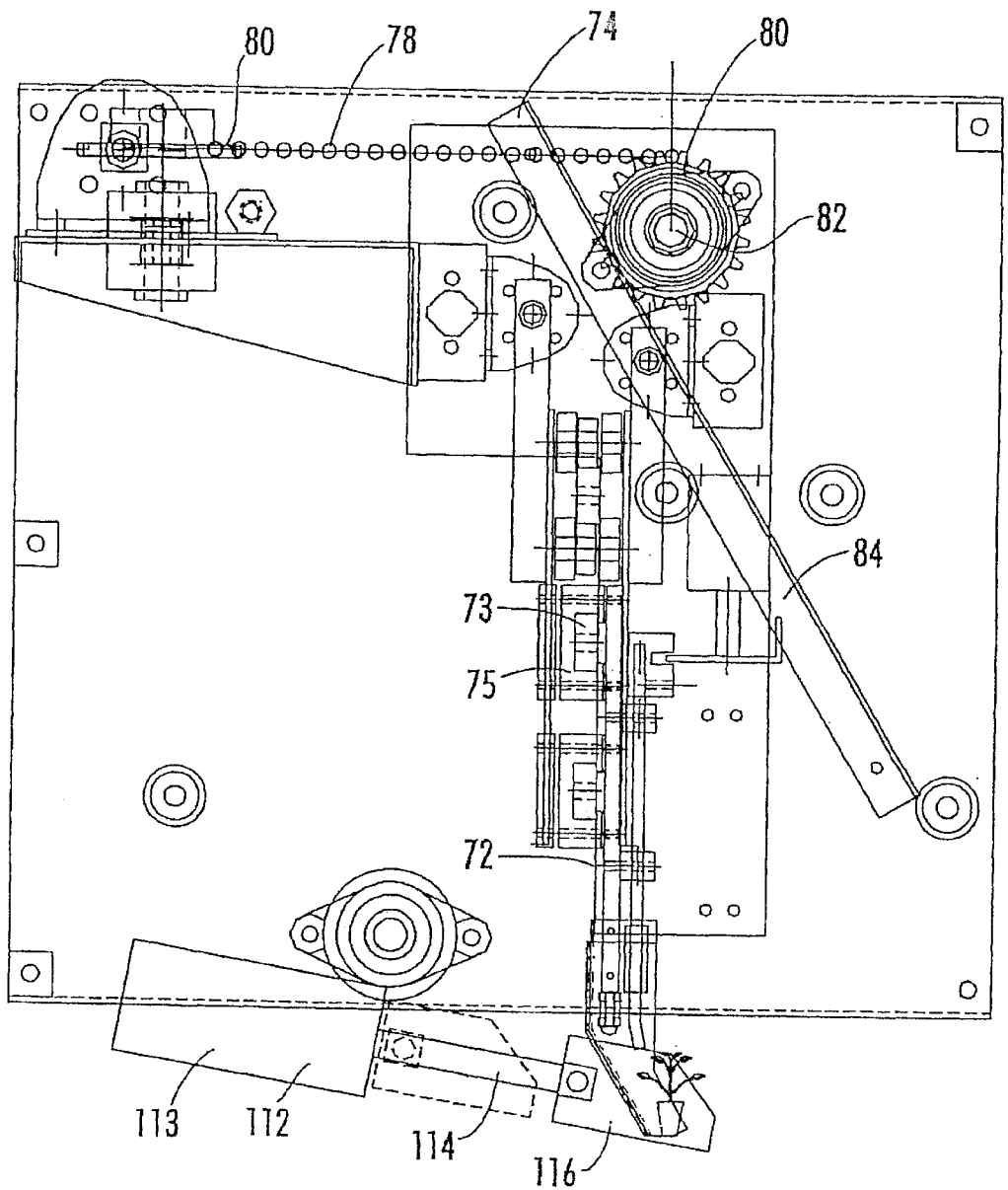
FIG. 4 is an enlarged plan view of an embodiment of a gripper assembly and positioning assembly, illustrating their interrelationship of the preferred embodiment of the present invention.
Figure 5A:
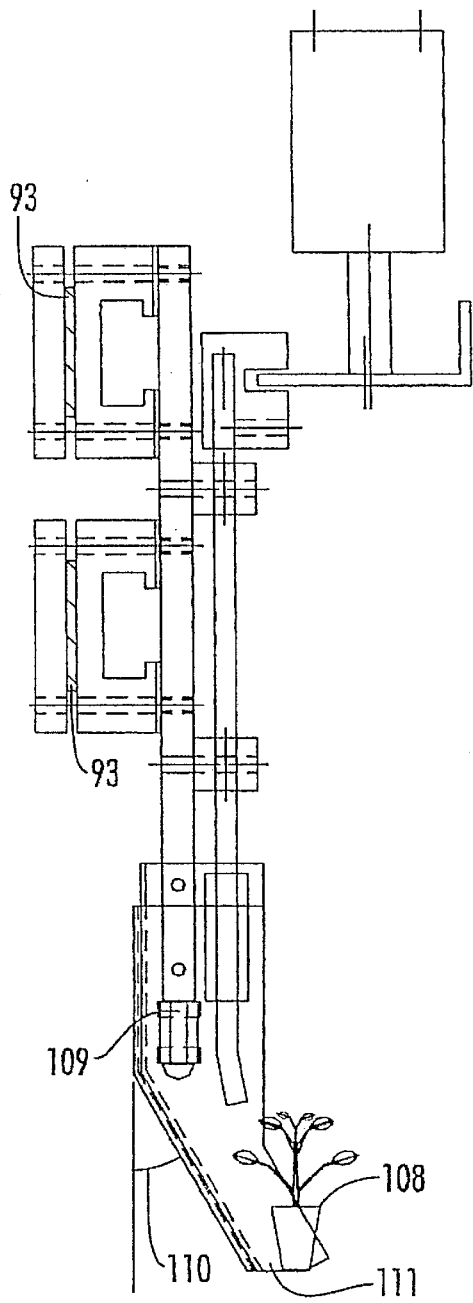
FIGS. 5A–5C are side, front and back views, respectively, of a gripper element of the present invention.
Figure 5B:
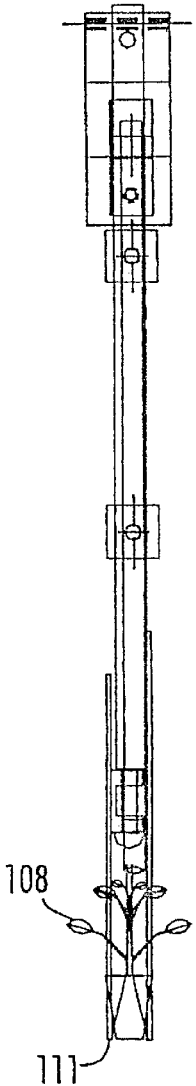
Figure 5C:
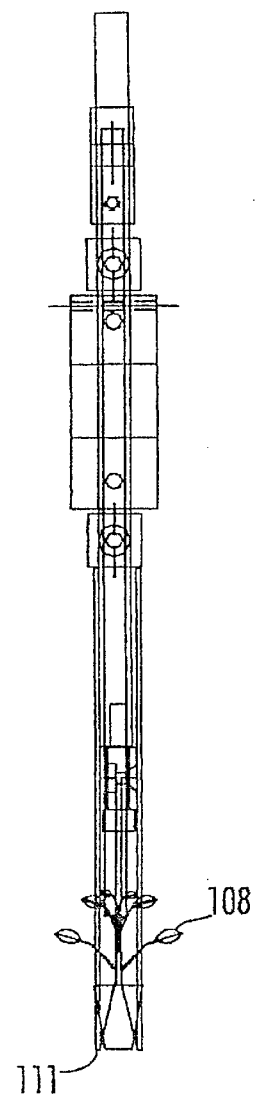

With reference to FIG. 4, an optional cleaning mechanism 112 is comprised of a reciprocating cylinder 113 having a shaft 114 which is reciprocal from an inward and outward position with respect to the cylinder 113. Hence, the free end of the shaft 114 has a cleaning plate 116 attached thereto. The cleaning plate is provided to scrape away any clinging soil or debris from the gripper fingers 107 after insertion of the seedling plug into the delivery tray 118 during each successive cycle of the machine. With reference to FIGS. 8 and 9, as well as the figures previously described, the mode of operation will be set forth below.

Figure 10:
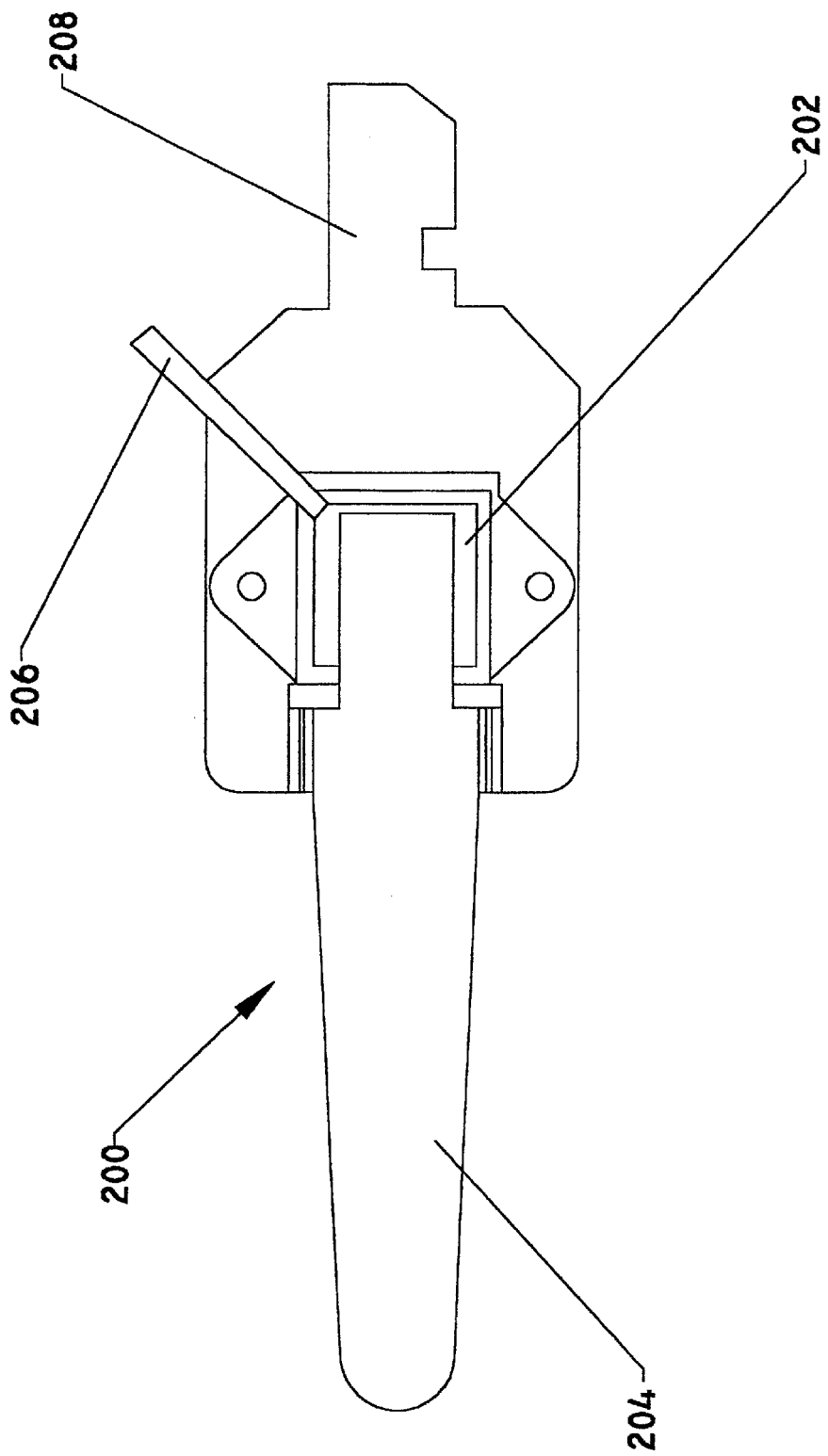
FIG. 10 is a side view of an alternate embodiment of a gripper component of the present invention.
Figure 11:
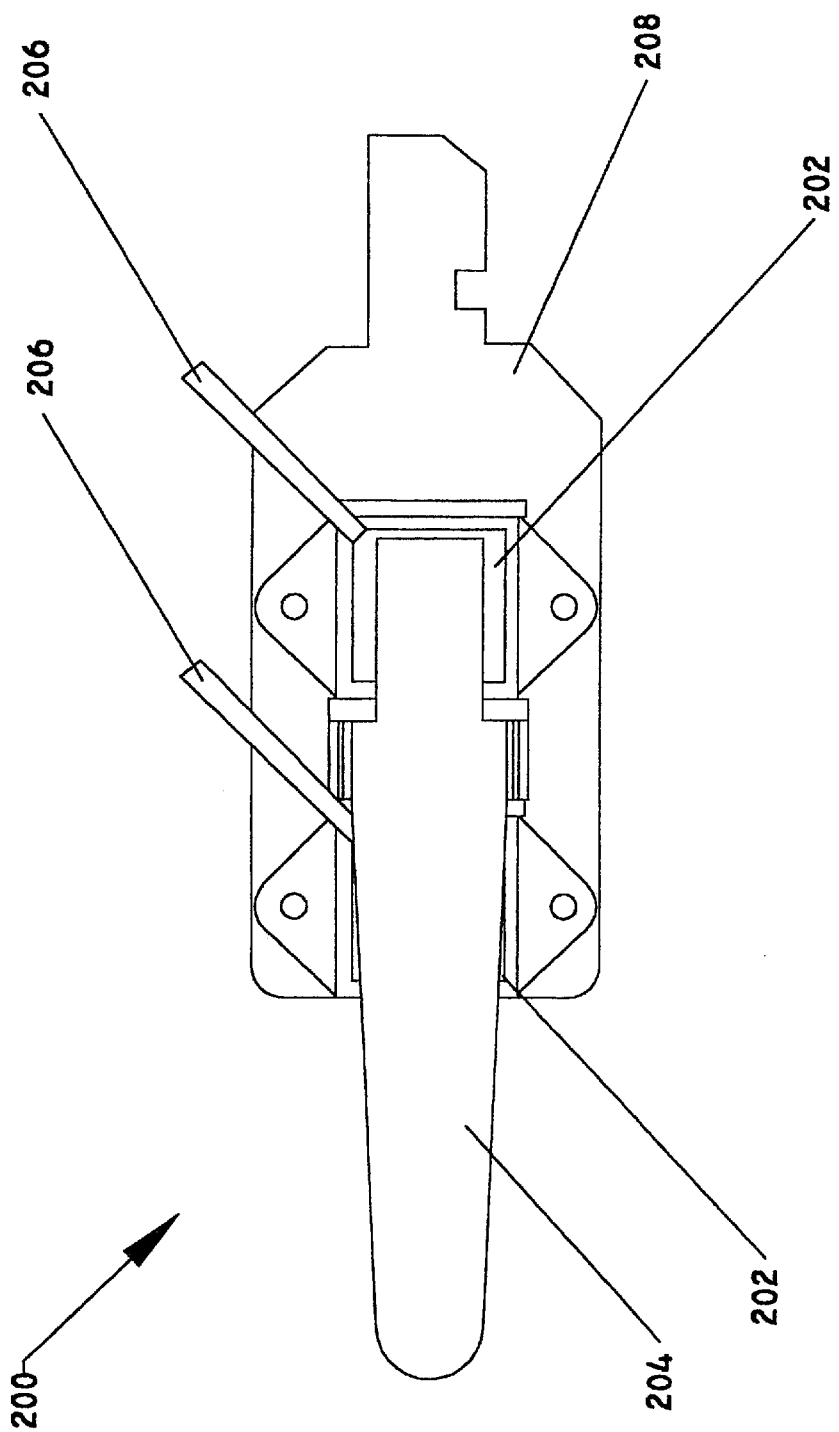
FIG. 11 is a side view of an alternate embodiment of a gripper component of the present invention.

With reference to FIGS. 10 and 11, an alternate embodiment of the gripper portion of the present invention is designated generally by the reference numeral 200. FIG. 10 shows a single bladder pneumatic gripper and FIG. 11 shows a double bladder gripper, which means that a single air bladder 202 or a plurality air bladders 202 may be used to selectively and operably open and close the finger portions 204 of the gripper 200.

Inlet tube 206 provides suitable structure by which air or some other suitable working fluid may be introduced into or removed from the air bladder 202. The configuration of the base plate 208 is largely non-critical so long as it enables the gripper components such as the air bladder(s) 202 and fingers 204 to be operably mounted or attached thereto in a manner sufficient to allow them to perform any of their intended functions, and be easily attached and detached from its mount as will be discussed hereinbelow.

Figure 6A:
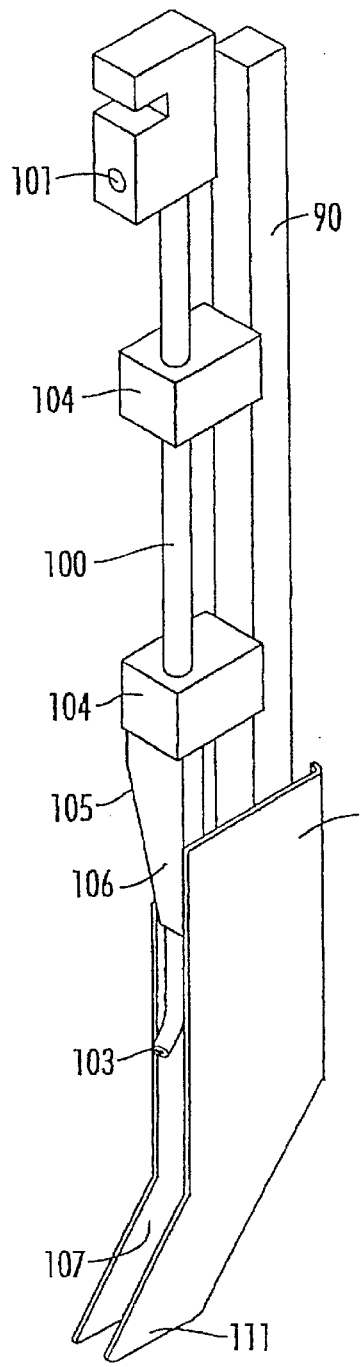
FIGS. 6A and 6B are elevated perspective views of an embodiment of a gripper of the present invention.
Figure 6B:
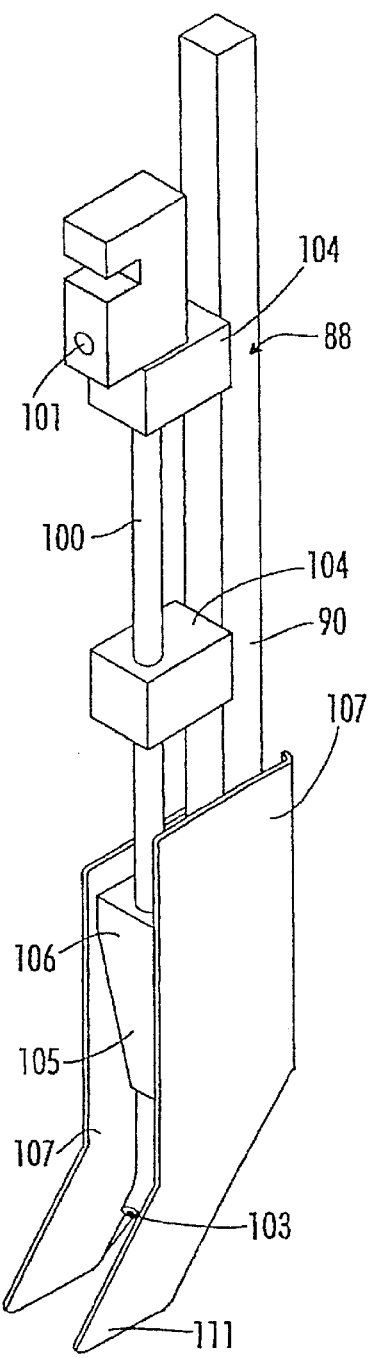
Figure 7:
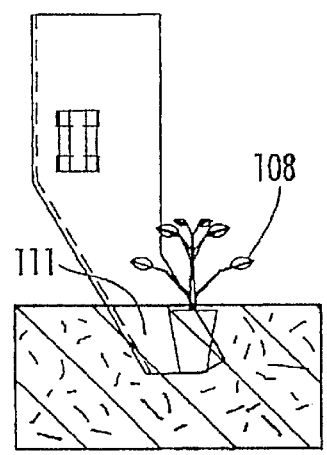
FIG. 7 is an enlarged fragmentary plan view of the gripper fingers of the grippers shown in FIGS. 5A–5C, and 6A–6B.
Figure 12:
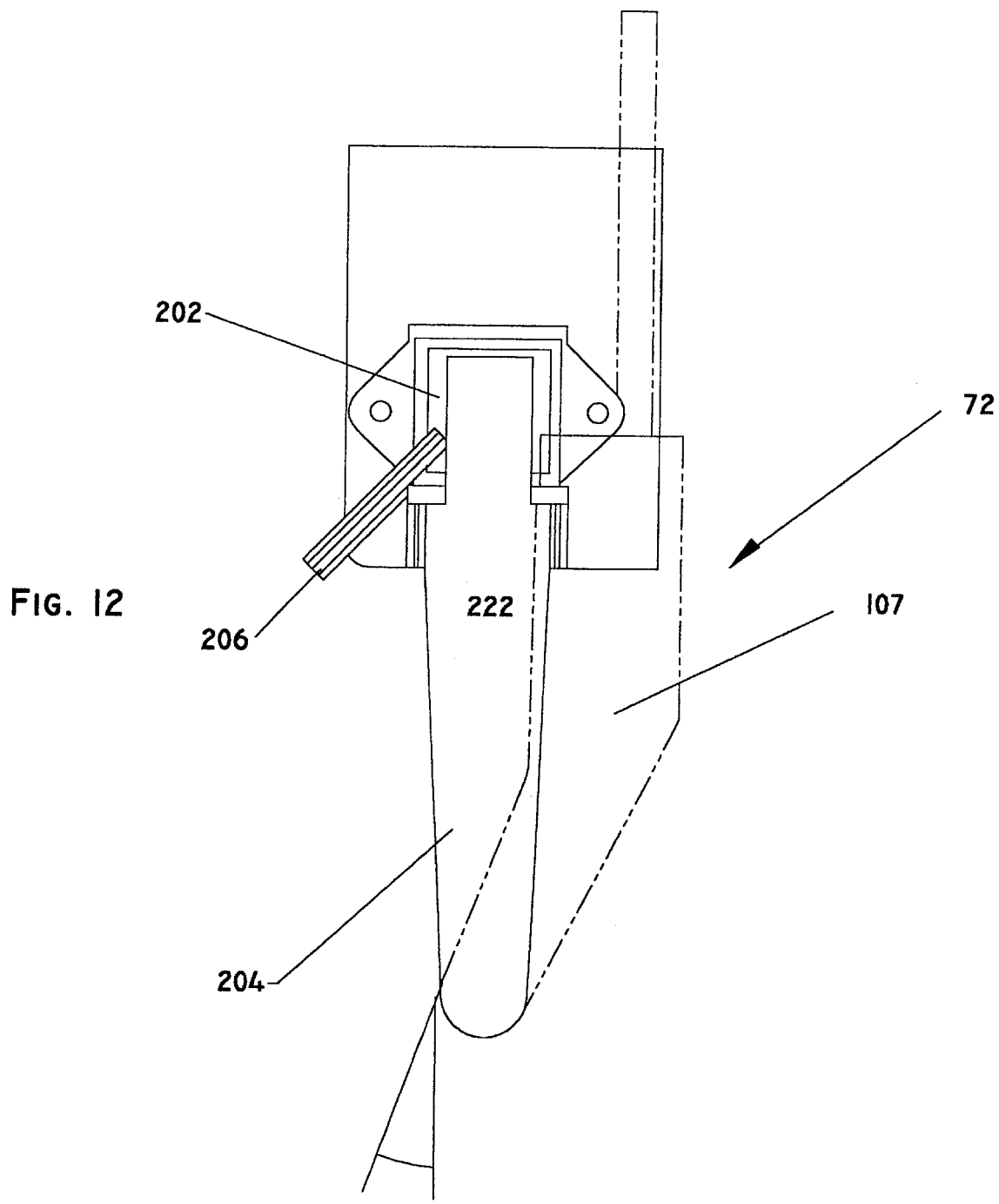
FIG. 12 is a side view of the gripper component shown in FIG. 10 with the gripper of FIG. 5A superimposed thereon and shown in dashed lines for comparison.
Figure 13:
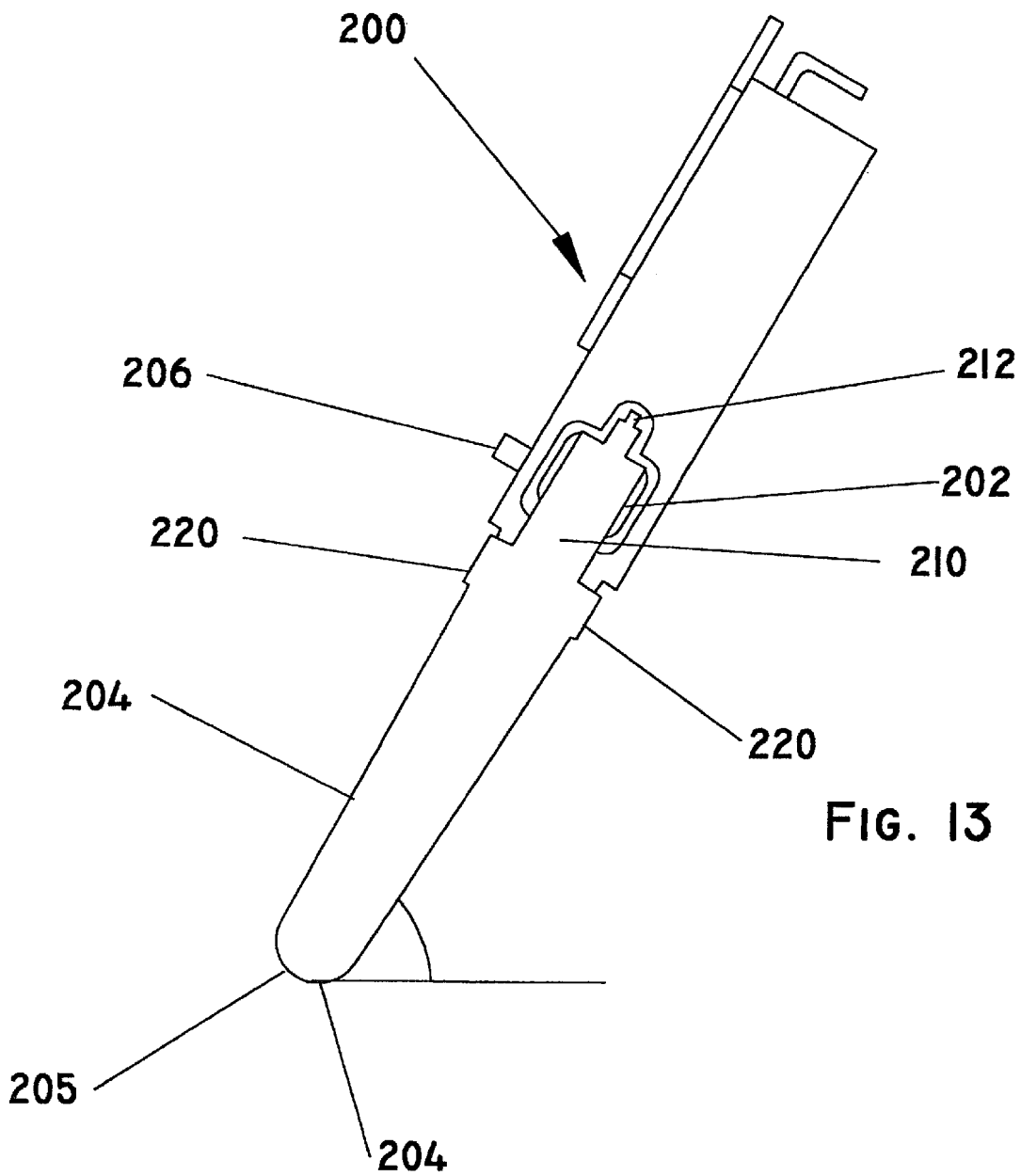
FIG. 13 is a side view of the gripper component shown in FIG. 10 and situated at a preferred operating angle alpha similar to that shown in FIG. 12.

With reference to FIGS. 12 and 13, gripper 200 (FIG. 10) or 266 (FIGS. 22A and 22B) is shown in relative vertical alignment with another embodiment of the gripper of FIGS. 6A and 6B as depicted by the dashed lines of FIG. 12. The dashed lines serve to point out the linear nature of the finger portions 204 of the gripper 200, or 284 of the gripper 266. As described above and herein below, the preferred embodiment of the apparatus includes a gripper assembly having gripper fingers 107 or 204 that approach the seedling to be transplanted at an angle. The vertical nature of the gripper show in FIG. 6A and 6B provides this angular line of attack by providing an angled finger portion 107, whereas the alternate embodiment is preferably rotated to an angle alpha (FIGS. 12 and 13) to provide an angle sufficient for transplanting operations.

Figure 14:
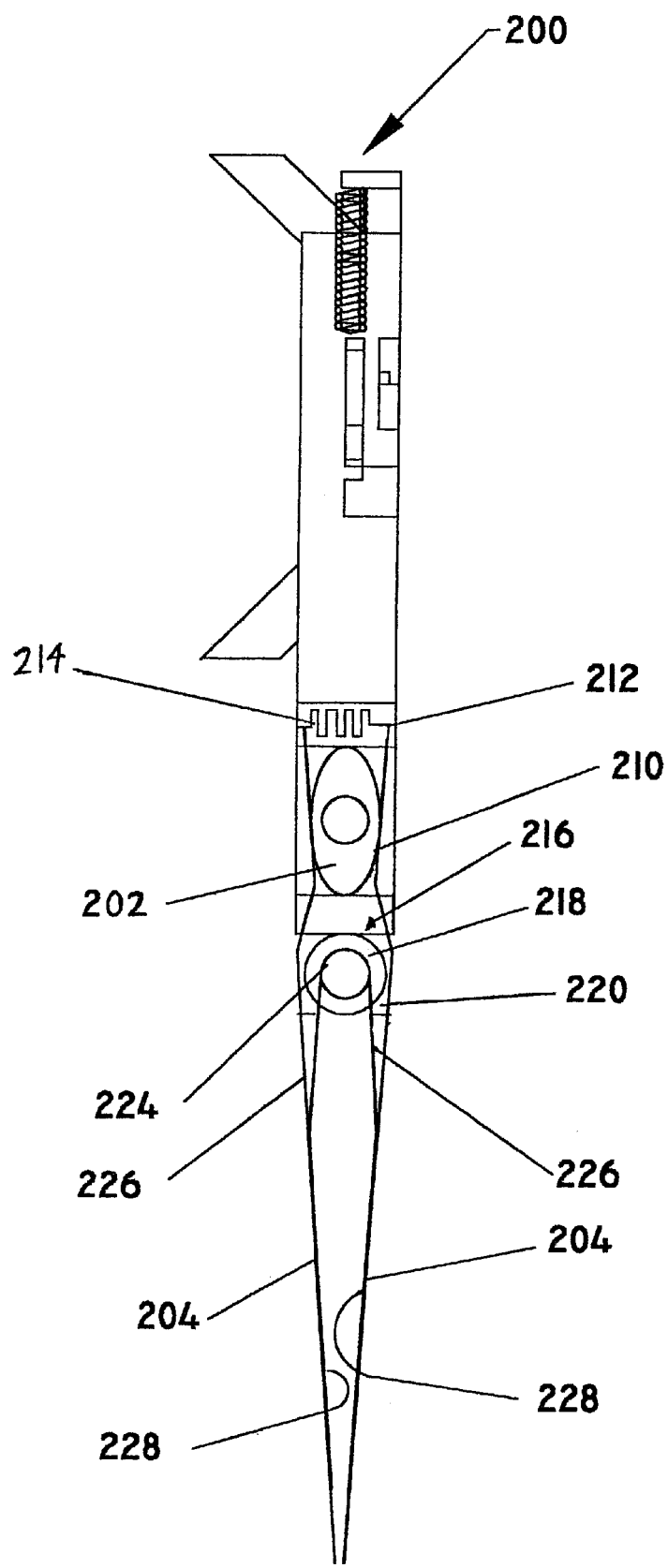
FIG. 14 is a front view of the gripper of FIG. 10 shown with the finger portions in a closed position and the air bladder inflated.
Figure 15:
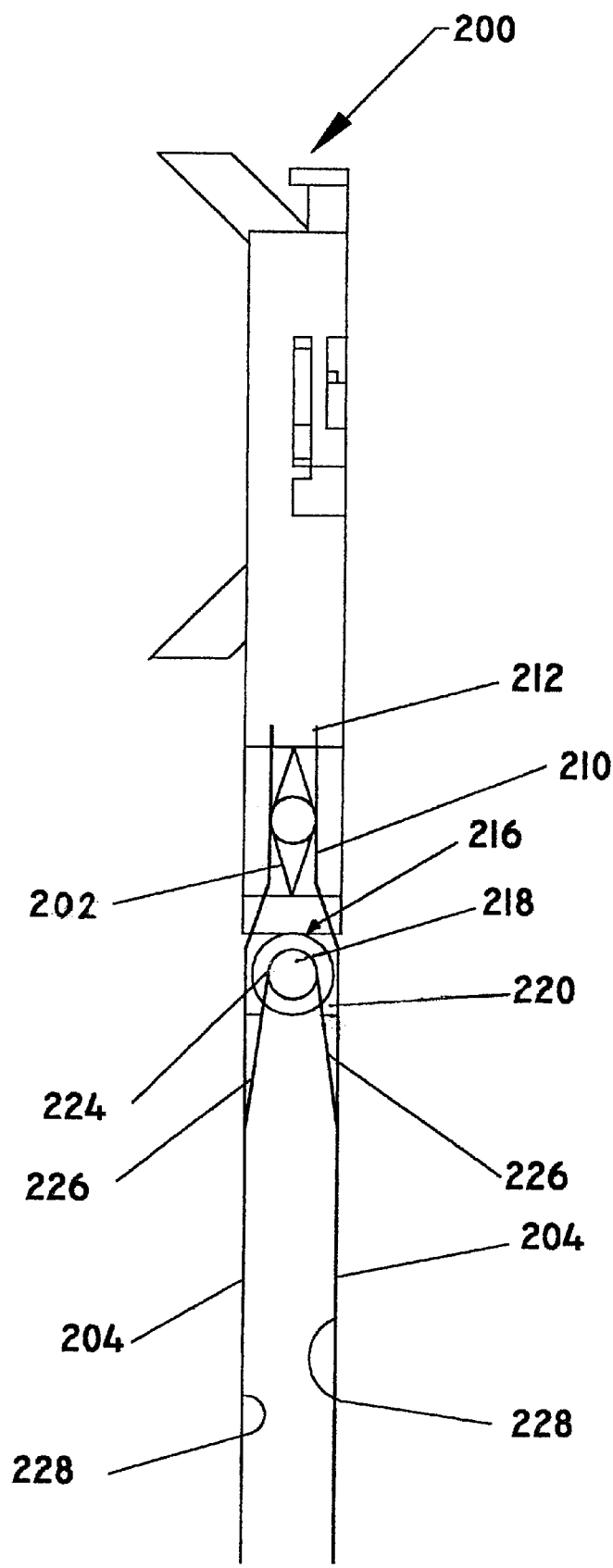
FIG. 15 is a front view of the gripper of FIG. 10 shown with the finger portions in an open position and the air bladder deflated.
Figure 22A:
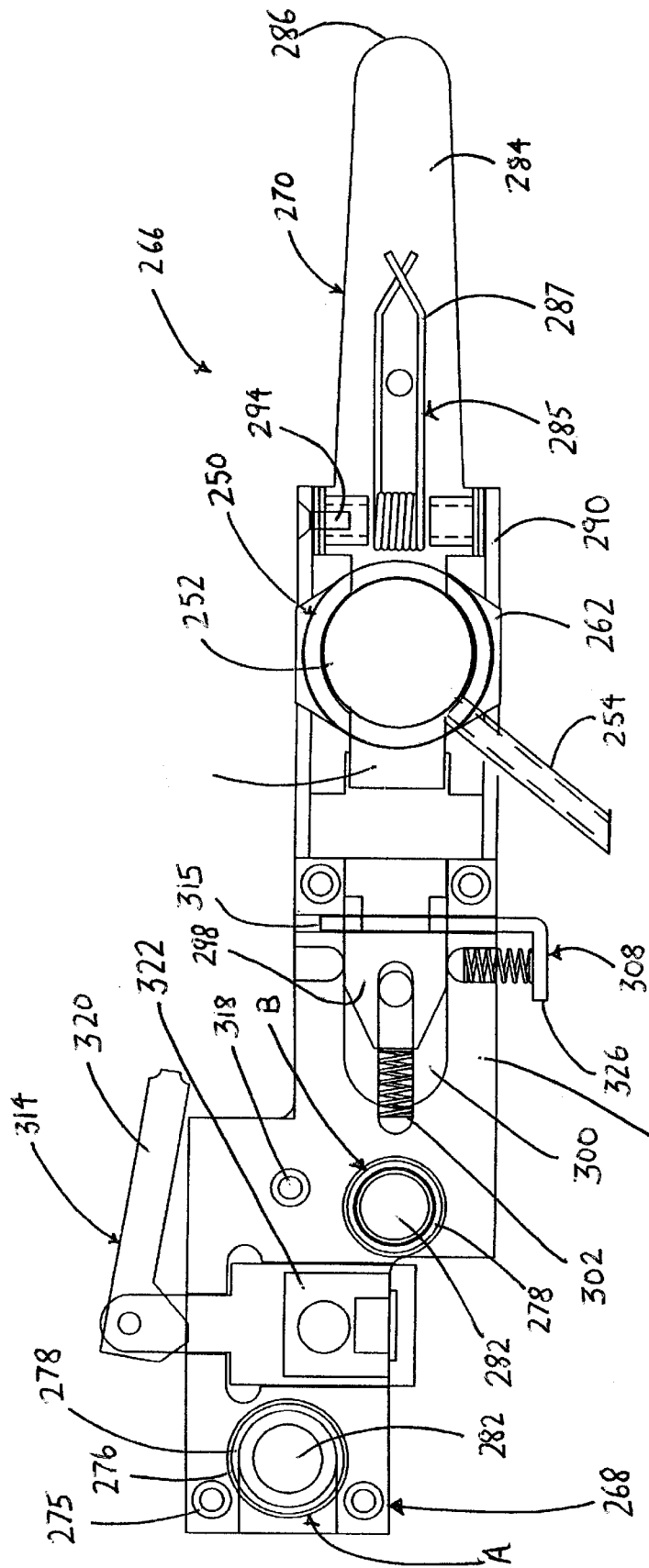
FIG. 22A is a elevated side of an alternate embodiment of the gripper component of the present invention incorporating the embodiment of the pneumatic separating member of FIG. 16.
Figure 22B:
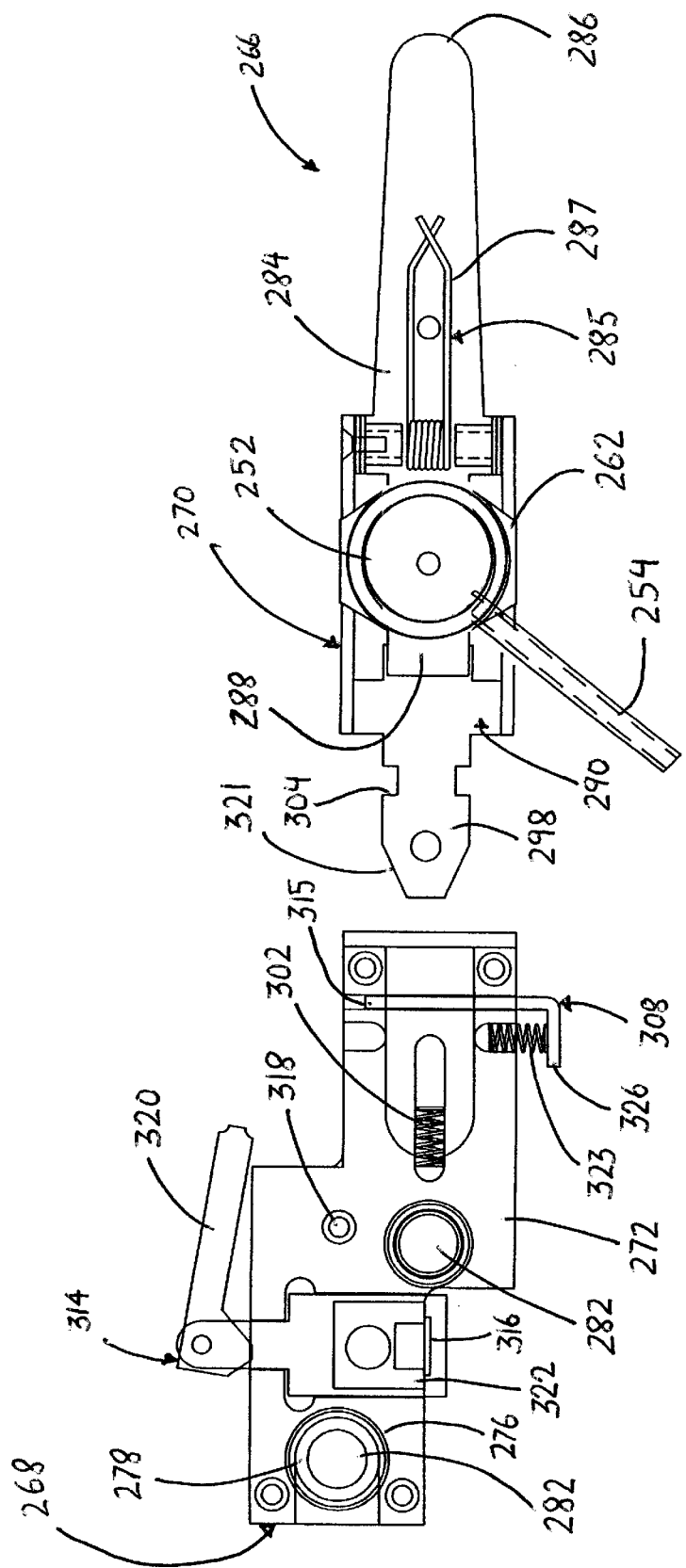
FIG. 22B is a elevated side of an alternate embodiment of the gripper component of the present invention incorporating the embodiment of the pneumatic separating member of FIG. 16 and illustrating the detached relationship of the attachment component and gripper assembly component of the present invention.
Figure 22C:
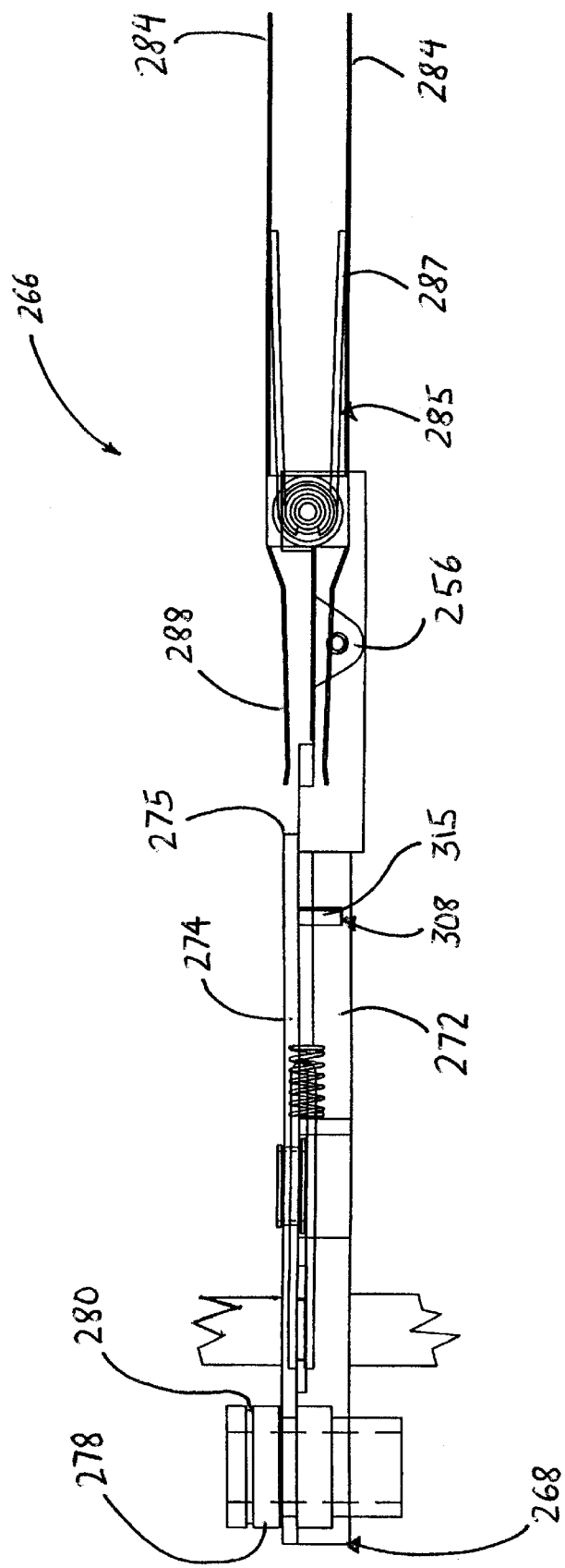
FIG. 22C is a front view of the alternate embodiment of the gripper component shown in FIG. 22A.
Figure 22D:
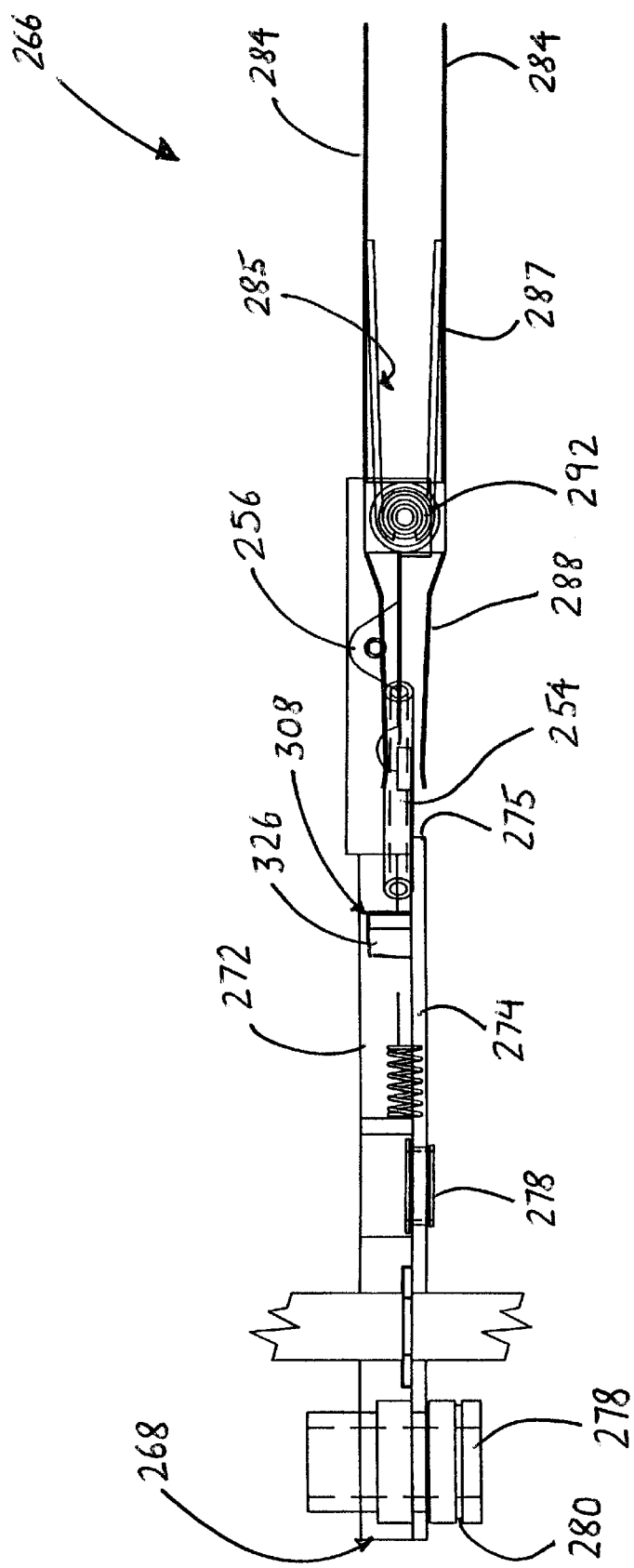
FIG. 22D is a back view of the alternate embodiment of the gripper component shown in FIG. 22A.

With reference to FIGS. 13–15 fingers 204 of the gripper 200, and FIGS. 22A and 22B, fingers 284 of the gripper 266, preferably include an arcuate distal end 205 or 286 respectively, a flanged proximal end 210 having a post 212 extending therefrom. Post 212 enables a coil spring (not shown), or other suitable biasing member, to bias the proximal portions 210 of the fingers 204 toward one another in the rest position when the air bladder 202 is deflated and the fingers 204 or 284 are open (FIGS. 15, 22C and 22D). Similarly, when the air bladder 202 is inflated, the biasing member in the form of a spring (285 in FIGS. 22A–22D) is stretched allowing the proximal ends 210 and posts 212 to separate and the fingers 204 to close (FIG. 14).

Axle assembly 216 is provided to enable the distal end 205 of the fingers 204 to selectively and operably move between an open and closed position while the proximal portion 210 of the fingers 204 moves in the opposite manner (i.e., closed or toward one another and open or away fro one another). The axle assembly 216 is held in position between the fingers 204 by a pin 218 which passes through the ears 220 extending from and substantially perpendicular to the planar surface 222 of the fingers 204. The pin 218, therefore, passes through the left or right side ears 220 of the fingers 204 and back through the opposing pair of right or left side ears 220 respectively of the fingers 204. In an alternate embodiment of the invention, post 212 and a coil spring 214 (FIG. 14) may be eliminated (FIG. 15) or supplement an alternate biasing member in the nature of a leaf spring 224 having leaves 226 extending therefrom (FIG. 14).

The leaf spring 224 or 285 (FIGS. 22A–22D) has a central diameter associated with its solid cylinder height that is sufficiently large to enable the pin 218 to pass therethrough. The leaves 226 or 287 extend from the leaf portion of the spring 224 and bear against the inside surface 228 of the fingers 204.

Figure 16:
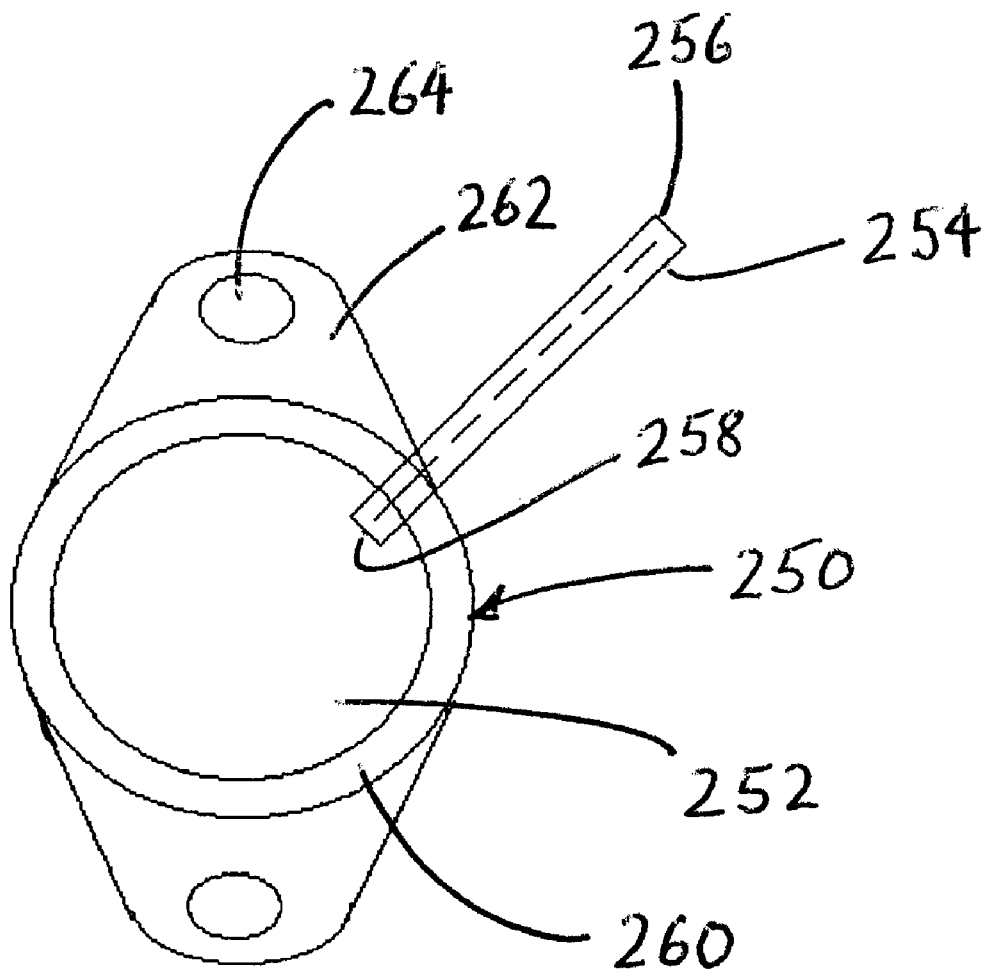
FIG. 16 is an elevated perspective view of an embodiment of the separating member of the present invention.

With reference to FIG. 16, an embodiment of the separating member, in this instance shown as an inflatable bladder designated generally by the reference numeral 250 is illustrated in isolation. Bladder 250 includes a chamber portion 252 which acts like a balloon so as to be capable of inflating and deflating in response to an air supply introduced into the chamber 252 via supply tube 254. The air supply tube 254 has a proximal end 256 which is connected to an air supply (not shown) associated with the transplanter of the present invention, and a distal end 258 which is in communication with the chamber 252. Peripheral seal 260 surrounds the chamber 252 and entry position of the air supply tube 254 as it enters the chamber 252. Optional flanges 262 are provided as a means of attaching the bladder 250 in a user selected position by passing a screw or other fastener (not shown) inserted through the apertures 264 in the flanges 262 and into the work piece (not shown) to which the bladder 250 is to be secured.

FIGS. 17, 18, 19, 20A, 20B, 21A, 21B, 21C, and 22A–22D, illustrate an alternate embodiment of the gripper assembly and its components which is designated generally by the reference numeral 266 (FIGS. 22A–22D). Gripper assembly 266 preferably includes an attachment block assembly 268 and a gripper finger assembly 270. The attachment block 268 further comprises a main body 272 (FIGS. 18, 22A–22D) and a cover 274 (FIGS. 17, 22C and 22D) secured thereto by fasteners 275. Apertures 276 are provided to receive bushings 278 which are best seen in FIGS. 22C and 22D. The opening diameter of the apertures are preferably sized to be slightly smaller than the largest outside diameter of the bushing. The preferred bushing type bearing further includes annular grooves 280, of which the outside diameter of one of them closely approximates the diameter of the apertures 276 to enable the bushing type bearings 278 to be secured therein by the placement of the cover 274 on the body 272.

The bearing bushings 278 have a interior central opening 282 which is provided to receive a guide rail (not shown) associated with the carriage portion of the frame of the inventive apparatus disclosed herein to allow the gripper assembly 266 to slide thereon and be secured thereto at multiple locations, designated as location "A" and "B" of FIG. 22A, to prevent inadvertent displacement of the gripper assembly 266 from its installed position during operation.

With reference to the gripper finger portion 270 of the gripper assembly 266, the finger portion assembly 270 further includes spaced apart finger elements 284 preferably including an arcuate distal end 286 and attachment ends 288. The finger elements 284 are secured to a frame 290 (FIGS. 21A–21C, 22B) by pivot pins 292 that engage pivot pin bores 294. Leaf spring 285 having leaves 287 is interpositioned between the finger elements 284. The bladder 250 is interpositioned between the finger elements 284 and secured to the frame 290 by attaching the flanges 262 to the frame 290 by fasteners (not shown) as described above.

Tang 298 (FIGS. 21A and 21B) is attached to or extends from the frame 290 and is of a sufficient length to enter into a slot 300 of the main body 272 having biasing member 302 positioned therein (FIG. 18). Tang 298 has at least one notch 304 (shown with two notches) formed in its distal end 306 to enable the quick disconnect component, designated generally by the reference numeral 308 of FIGS. 22A–22D, positioned in the groove 309 of the main body 272 to cooperate with the notch(es) 304 of the frame 290 enabling the gripper finger assembly 270 be easily attached and detached from the main body 272.

Biasing member 302 provides a gripper finger assembly eject when the actuating lever component 307 generally of the quick disconnect 308 of the main body 272 is actuated and the gripper finger assembly 270 is released therefrom during detachment. During use, disconnect 308 and more particularly actuating lever 307 further includes tab portion 326 and projections 313 and 315. Projection 313 is provided to extend upward through one of the bores 317 of the cover 274, and projection 315 is provided to extend beyond the width of the groove 309 of the body 272. The projection 313 and 315 serve to stabilize the position of the disconnect 308 mechanism and actuating lever 307 within the groove 309 of the main body 272 and insure its proper alignment with the notches 304 of the frame 290 when the tang 298 is inserted into the combination of the body and cover 272 and 274 respectively, through the slot 300 during use.

Tang 298 has a beveled portion 321. When the tang 298 is inserted into the combination of the body 272 and cover 274 via the slot 300, it to passes through the gap designated generally by "G" of FIG. 20A and between the shoulders 319 of the disconnect actuating lever 307 by the force of the beveled portion 321 against the shoulders 319 which in turn causes the tab 326 to compress the biasing member 323 and center the shoulders 319 for insert therebetween into the gap G.

After the tang 298 is installed, at least one of the notches 304 abuts against at least one of the shoulders 319 to hold it in place until the tab 326 is depressed during disconnect in order to align the gap G with the width of the tang 298 and disengage the abutting contact between the shoulder 319 and the notch 304 allowing the biasing member 323 to eject the frame 290 from the slot 300.

It should be further noted that the cover 274 is longer than the body 272 in the preferred embodiment. The overhang of the cover 274 is best seen in FIGS. 22C and 22D and provides a one way attachment of the gripper finger assembly 270 to the attachment assembly 268 by the abutting contact between the cover edge 275 and the ledges 299 of the frame 290 if the frame 290 is upside down when installation is attempted.

Gripper assembly 266 also includes a cable or belt clamping mechanism designated generally by the reference numeral 314, which is provided to properly space the attachment portion 268 of adjacent gripper assemblies 266 in an array necessary for operation of the inventive apparatus in the manner described above.

Aperture 318 enables a separating cable (not shown) to pass therethrough. The separating cable is laced though the aperture 318 of each gripper assembly to keep the separating cable free of obstructions. In use as described below, each gripper assembly is linked to a strand of stretch resistant belting, the edge of which is shown as 316 of FIG. 22B. Thus, the user selected separation distance between adjacent gripper assemblies is selected by opening the clamping member by lifting its lever 320 and releasing the pressure of its clamping jaw 322 against the belt 316 so it can be moved freely. After the gripper assembly is positioned, the lever 320 is cammed downward causing the jaw 322 to squeeze against the belting 316 thereby securing the gripper assembly to the belting.

At least one gripper assembly separating block (not shown) is positioned on each side of the array of gripper assemblies. The separating block is configured similarly to the attachment portion 268 of the gripper assembly 266. That is, the left most and right most gripper assembly has an adjacent gripper assembly next to it with respect to the frame of reference direction moving inward toward the other gripper assemblies of the array, and a separating block is positioned on its other free side were no other gripper assembly is installed. The separating blocks are also attached to the ends of the non-flexible belting to which the gripper assemblies are attached, and secured to the separating cable.

The separating cable is interlaced through a series of left and right pulleys (not shown) which are attached to the carriage of the inventive apparatus and are secured to a drive block which is preferably positioned behind the array of gripper assemblies and rides on its own set of guide rails. The drive block causes the array of gripper assemblies to open and close in response to its motion left or right by the moving the separating blocks with the separating cable attached to them. By virtue of the separating block attachment to the belting along with the gripper assemblies in the array, the gripper assemblies separate to the left and right simultaneously by being dragged along the guide bars by the separating blocks to the maximum extent allowed by their positioning on the belting.

Depending upon the arrangement of the drive block, a movement to the left will cause the separating cable to drag the separating block on the left of the gripper array to the left and the separating block on the right of the gripper array to the right. A reverse motion of the drive block causes the separating blocks to move in the opposite direction which in unison consecutively clamp the gripper assemblies together in a accordion like fashion.

MODE OF OPERATION

The preferred embodiment of the present invention designated generally by the reference numeral 10 is particularly useful in transplanting seedlings 46 from a plug tray 47 to a delivery tray 118. The preferred embodiment of the invention is particularly useful when the seedlings are begonias or other broad leafy foliage. Begonias have leafy foliage on short stems, thus making their handling by mechanized equipment delicate to prevent damage to the seedling during transplanting.

When the system is actuated, a seedling tray 47 is placed on the seedling feed conveyor system 22 between spaced apart separator bars 24. The feed conveyor system 22 shuttles the entire seedling tray 47 into alignment with a plate 51 having a row of holes 53 positioned therein. Considering that the seedling tray has drain holes in the bottom of the tray associated with each compartment for each individual seedling plug, the holes in the seedling tray align with the holes in the plate. When the holes in the tray and the holes in the plate are aligned through the shuttling action of the feed conveyor system 22, a plurality of vertical pins 55 (FIG. 8) rise up through the holes in the plates through the holes in the tray and raise the seedling plug 46 from its compartment. An entire row of seedlings is raised at one time. When in the raised position, the seedling plugs rest atop the pins. In this position, the gripper assembly carriage 70 is driven forward by the actuating cylinder 64. When in the forward position, the plunger 106 is pressed downward to open the gripper fingers 107 or 284.

As the gripper fingers 107, 204 or 284 open in response to the plunger 106 of fingers 204, fingers 284 in response to the air bladder 202, they are moved around adjacent sides of the seedling plug 108 in a lateral manner so as not to damage the leaves which are often fragile (e.g., begonias). The lateral movement of the grippers 88 or 266 and the lateral grasping action of the gripper fingers 107 or 204 or 284 prevents damage to the seedling. In addition, the angle alpha of the gripper fingers 107, or of presentation of the grippers fingers 204, 284, enables the gripper fingers 107 or 204 or 284 to grasp the seedling plug at its root ball as opposed to its green foliage.

When the gripper fingers are on adjacent sides of the seedling plug, the separating member or plunger 106 is extracted allowing the gripper fingers 107 to pinch closed, or the separating member or air bladder 202 to inflate allowing the gripper fingers 204, 284 to pinch closed, and take possession of the individual seedlings.

After the gripper fingers 107 or 204 or 284 take possession of the seedlings, the gripper finger carriage is reciprocated rearward by the cylinders 64 or other motor and belt system and into their transplanting position. After the carriage 70 is moved to its rearward transplanting position, the individual grippers 88 are extended laterally along the guide 73. The separation of each individual gripper is predetermined by the operator and the manner in which the operator adjusts the connection of the link belt 93 attached to each gripper 88. That is, the gripper finger assemblies are separated and contracted as a unit in an accordion like fashion. When separated, the positioning assembly allows the carriage 70 to travel down the inclined track 74 through the interrelationship of the gears 85 and 86 which is caused by allowing the actuating cylinder 76 to release the plunger 77 and, therefore, allow the length of chain 78 to travel in a direction outward from the plunger 77. As the chain 78 is released, the gripper fingers 107 or 204 or 284 then pierce the soil at an angle "alpha", either due to the angled fingers or the angle of presentation, of the delivery trays driving the seedling plug, after introduction of the tips of the gripper fingers 107 or 205, or 286, into the soil and thereby transplant them.

At the point and time when the gripper fingers have inserted the seedling 46 into the soil of the delivery trays, a jet or spray of water is dispensed through the water tube 100 of each individual gripper 88, or other watering source. The jet or spray of water is directed to impinge upon the root ball of the seedling plug and, therefore, help dispense it and release possession of it from the gripper fingers 107 or 204 or 284. The jet spray of water is also believed to promote immediate assimilation of the newly transplanted seedling into the delivery trays as the water causes the soil of the seedling plug to coalesce with the soil in the delivery tray.

Once the insertion and the ejection of the jet spray of water is accomplished, irrespective of the source, the grippers 84 and 200 and 266 are extracted from the soil of the seedling delivery tray by the track 85 and gear 86 relationship described for the insertion except in the reverse process. When this is complete and the grippers are extracted, they combine in a condensing accordion like fashion and an optional cleaning mechanism 112 engages the gripper fingers. The cleaning mechanism plates 116 scrape the remaining soil and debris from the ends of the gripper fingers 107 or 204 or 284 so as to provide a substantially clean gripper finger 107 or 204 or 284 ready for the next cycle of transplanting.

The process is continued and repeated until the seedlings feed tray 47 is empty. When the seedling feed tray 47 is empty, it is shuttled toward the trap door 36 which opens and allows the empty tray to fall beneath the seed conveyor, at which time the next seedling tray is shuttled into position to restart the entire process.

These and other embodiments of the present invention shall become apparent after consideration of the scope of the enclosed specification and drawings. All such alternate embodiments and equivalents are deemed to be part of the present invention whose only limitation is the scope of the appended claims.

What is claimed is:

1. An automated apparatus for transplanting plant plugs from a plug tray to another tray, comprising a frame having a front, a back, and spaced apart side members;

a conveyor system for shuttling seedling trays into and out of the apparatus;

a carriage supported by the frame;

at least one gripper assembly supported by the carriage and having at least two finger elements configured for engagement with a root ball associated with the plant plug; and a disconnect mechanism to enable the gripper finger elements to be easily attached and detached from the carriage.

2. The apparatus of claim 1, further including:

a wetting apparatus for supplying liquid to the plant plugs.

3. The apparatus of claim 1, wherein the conveyor system further includes:

a first conveyor system and a second conveyor system.

4. The apparatus of claim 1, wherein the at least one gripper further includes:

a separating member configured to enable the at least two finger elements to be opened and closed during operation of the apparatus.

5. The apparatus of claim 1, wherein the at least one gripper assembly further includes:

a bushing type bearing system for attaching the at least one gripper assembly to the carriage.

6. The apparatus of claim 1, further including:

a flexible belt supported by the carriage and attached to each of the at least one gripper assembly to maintain a constant spacing between each of the at least one gripper assembly.

7. The apparatus of claim 1, further including:

a plurality of gripper assemblies and separating means for separating the plurality of gripper assemblies the predetermined user selected distance.

8. An automated apparatus for transplanting seedlings from a first tray to a second tray, the apparatus having a frame, a conveyor system to shuttle seedlings, and at least one gripper assembly supported by a carriage which is supported by the frame, wherein the gripper assembly comprises:

a fingered portion having a plurality of finger elements configured for grasping a root ball of a seedling;

a separating mechanism configured to enable the plurality of finger elements to open; and a disconnect mechanism to enable the portion of the gripper assembly having the plurality of finger elements to be easily attached and detached from the carriage.

9. The gripper assembly of claim 8, wherein the separating mechanism further includes:

a member interpositioned between the plurality of finger elements which causes the finger elements to open and close in response to its movements.

10. The gripper assembly of claim 9, wherein the separating member comprises:

an air bladder.

11. The apparatus of claim 8, wherein the carriage further includes:

a guide rod system onto which the at least one gripper assembly is reciprocally attached.

12. The apparatus of claim 11, further including:

a bushing type bearing system interpositioned between the guide rod system and the at least one gripper assembly.

13. A gripper configured for use with an automated seedling transplanting apparatus for transplanting seedlings from a first tray to a second tray and having a guide rod system enabling at least one gripper assembly to reciprocally slide, wherein the gripper comprises:

an attachment portion configured to enable the gripper to be moveably attached to the guide rod system;

a plurality of finger elements configured to grasp the root ball of a seedling;

a separating member operably interpositioned between the plurality of finger elements to enable them to open and close; and a disconnect mechanism enabling the finger elements to be easily attached and detached from the attachment portion.

14. The gripper of claim 13, wherein the separating member is:

an air bladder.

15. The gripper of claim 14, wherein the separating member further partially comprises:

air supply means for selectively inflating or deflating the air bladder.

16. The gripper of claim 13, wherein the separating member is:

a plunger.

* * * * *